United States Patent
Ito et al.

(10) Patent No.: US 6,464,367 B2
(45) Date of Patent: Oct. 15, 2002

(54) SURFACE LIGHT SOURCE SYSTEM

(75) Inventors: Tomotaka Ito; Tomoya Yano, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/792,832

(22) Filed: Feb. 23, 2001

(65) Prior Publication Data
US 2001/0017774 A1 Aug. 30, 2001

(30) Foreign Application Priority Data

Feb. 24, 2000 (JP) ........................................ 2000-052288
May 22, 2000 (JP) ........................................ 2000-150462

(51) Int. Cl.$^7$ ................................................ F21V 7/04
(52) U.S. Cl. ........................... 362/31; 362/241; 362/27; 362/248; 362/237
(58) Field of Search ................. 362/31, 237, 241, 362/247, 248, 26, 27; 359/628; 385/901

(56) References Cited

U.S. PATENT DOCUMENTS 6,241,358 B1 * 6/2001 Higuchi et al. ............... 362/31
6,290,364 B1 * 9/2001 Kioke et al. .................. 362/31

* cited by examiner

Primary Examiner—Sandra O'Shea
Assistant Examiner—Ali Alavi
(74) Attorney, Agent, or Firm—Sonnenschein, Nath & Rosenthal

(57) ABSTRACT

Disclosed is a tandem type surface light source system allowing a uniform luminance over the surface light source. The surface light source system includes a plurality of bar-like light sources disposed in parallel to each other; reflecting members, each of which is disposed to surround a right or left side, an upper side, and a lower side of the corresponding one of the light sources; light guide plates made from a transparent material, each of which is disposed along the left or right side of the corresponding one of the light sources, and is formed into a taper shape in cross-section along the traveling direction of light; and reflecting sheets, each of which is disposed on the back surface of the corresponding one of the light guide plates. In this system, each of at least the second and later ones of the light guide plates is, at its end portion on the light source side, integrated with a light introducing portion made from a transparent material. The light introducing portion extends from the end portion, on the light source side, of the above light guide plate to a position under an end portion of the front side light guide plate adjacent to the above light guide plate.

55 Claims, 10 Drawing Sheets

SURFACE LIGHT SOURCE SYSTEM

BACKGROUND OF THE INVENTION

The present invention relates to a surface light system used for backlighting of liquid crystal displays or the like, and particularly to a so-called tandem type surface light source system.

As the surface light source system, there has been known a so-called tandem type surface light source system allowed to obtain a more uniform luminous intensity over a wider area.

A configuration of a related art tandem type surface light source system will be described below with reference to FIGS. 1A and 1B.

Referring to FIG. 1A, there is shown a surface light source system 1 including a plurality (three in the example shown in the figure) of fluorescent tubes 2a, 2b, and 2c which horizontally extend in the direction perpendicular to the longitudinal direction of the system 1 in such a manner as to be spaced from and in parallel to each other; light guide plates 3a, 3b, and 3c made from a transparent material, which extend along right or left sides (right sides in the example shown in the figure) of the fluorescent tubes 2a, 2b, and 2c; reflectors 4a, 4b, and 4c disposed on the opposed sides (left sides in the example shown in the figure) to the light guide plates 3a, 3b, and 3c in such a manner as to surround the fluorescent tubes 2a, 2b, and 2c; reflecting members 5a, 5b, and 5c disposed under the light guide plates 3a, 3b, and 3c; and a lens sheet 6 disposed over the light guide plates 3a, 3b, and 3c.

Each of the light guide plates 3a, 3b, and 3c is formed into a shape in cross-section which tapers as a wedge in the direction from the corresponding one of the fluorescent tubes 2a, 2b, and 2c to the opposed side. In the example shown in the figure, the light guide plates 3a, 3b, and 3c are integrated with each other.

According to the surface light source system 1 having the above--configuration, light rays emitted from the fluorescent tubes 2a, 2b, and 2c directly enter the light guide plates 3a, 3b, and 3c or are reflected from the inner surfaces of the reflectors 4a, 4b, and 4c and enter the light guide plates 3a, 3b, and 3c; the light rays, which pass through the light guide plates 3a, 3b, and 3c, are reflected from the reflecting members 5a, 5b, and 5c to direct upwardly through the light guide plates 3a, 3b, and 3c, and are diffused by the lens sheet 6; and the light rays thus diffused by the lens sheet 6 light a liquid crystal display (not shown) from the back surface thereof, for example.

The surface light source system 1, however, has a problem. At the ends and their neighborhoods, on the fluorescent tube sides, of the light guide plates 3a, 3b, and 3c, part of light rays, which have entered the light guide plates 3a, 3b, and 3c from the fluorescent tubes 2a, 2b, and 2c directly or by way of reflection from the inner surfaces of the reflectors 4a, 4b, and 4c, may be directly emerged outside therefrom without total reflection at the top surfaces of the light guide plates 3a, 3b, and 3c.

As a result, as shown in FIG. 1B, at the ends and their neighborhoods, on the fluorescent tube sides, of the light guide plates 3a, 3b, and 3c, the luminance becomes significantly higher, so that uneven luminance portions appear in the luminance distribution of the surface light source system 1. To be more specific, on the top surface of the lens sheet 6, luminance becomes higher at portions near the fluorescent tubes 2a, 2b, and 2c, with a result that there occurs large differences in luminance between the portions near the fluorescent tubes 2a, 2b, and 2c and other portions. In particular, if the light guide plates 3a, 3b, and 3c are divided from each other, bright lines and shades occur along the division lines, thereby failing to obtain a uniform surface light source.

SUMMARY OF THE INVENTION

An object of the present invention is to provide a tandem type surface light source system allowing a uniform luminance over the surface light source.

To achieve the above object, according to a first aspect of the present invention, there is provided a surface light source system including: a plurality of bar-like light sources disposed in parallel to each other; reflecting members, each of which is disposed to surround a right or left side, an upper side, and a lower side of the corresponding one of the light sources; light guide plates made from a transparent material, each of which is disposed along the left or right side of the corresponding one of the light sources, and is formed into a taper shape in cross-section along the traveling direction of light; and reflecting sheets, each of which is disposed on the back surface of the corresponding one of the light guide plates; wherein each of at least the second and later ones of the light guide plates is, at its end portion on the light source side, integrated with a light introducing portion made from a transparent material, the light introducing portion extending from the end portion, on the light source side, of the light guide plate to a position under an end portion of the front side light guide plate adjacent to the light guide plate.

With this configuration, the system functions as a surface light source as follows. Light rays enter the light introducing portions directly or indirectly, that is, by way of reflection from the inner surfaces of the reflecting members, being subjected to total reflection from the top or bottom surfaces of the light introducing portions, and enter the light guide plates. The light rays having entered the light guide plates travel throughout the light guide plates while being repeatedly subjected to total reflection from the top surfaces of the light guide plates and to reflection from the reflection sheets located on the back surfaces of the light guide plates, and are emerged from the top surfaces of the light guide plates.

As described above, the light rays having entered the light introducing portions are not directly emerged from the top surfaces of the light guide plates, and accordingly, it is possible to suppress occurrence of locally high luminous lines at ends and their neighborhoods, on the light source sides, of the light guide plates, which luminous lines have occurred in the related art system. This makes it possible to prevent occurrence of unevenness of luminance and hence to obtain a uniform luminance over the surfaces of the light guide plates.

In this system, each of at least the second and later ones of the reflecting sheets may extend along the back surface of the corresponding one of the light introducing portions. With this configuration, when the light rays, which have been emitted from the light sources and entered the light introducing portions, are emerged downwardly therefrom without total reflection from the bottom surfaces of the light introducing portions, the light rays thus emerged downwardly are returned in the light introducing portions by the reflecting sheets.

In the system, an end plane, on the light source side, of each of the light introducing portions may be formed with its upper end tilted in the direction of the light guide plate. With this configuration, since light rays having been emitted from the light sources enter the light introducing portions while being refracted downwardly, the light rays reflected from the bottom surfaces of the light introducing portions are made incident on the top surfaces of the light guide plates at small incident angles, to be thereby less subjected to total reflection from the top surfaces of the light guide plates. This is effective to prevent occurrence of shades at boundaries between the light guide plates.

In the system, a top surface or bottom surface of each of the light introducing portions may be subjected to a coarsening treatment. With this configuration, since light rays, which have been emitted from the light sources and entered the light introducing portions, are irregularly reflected from the coarsened top or bottom surfaces of the light introducing portions, the light rays thus irregularly reflected are less subjected to total reflection from the top surfaces of the light guide plates. This is effective to prevent occurrence of shades at boundaries between the light guide plates.

In the system, each of the light introducing portions may be formed into a taper shape in vertical cross-section. With this configuration, since light rays, which have been emitted from the light sources, entered the light introducing portions, and reflected from the bottom surfaces of the light introducing portions, are made incident to the top surfaces of the light guide plates at small incident angles, the light rays are less subjected to total reflection from the top surfaces of the light guide plates. As a result, it is possible to prevent occurrence of shades at boundaries between the light guide plates.

In the system, a space, which is formed between an end plane, on the light source side, of each of the light introducing portions and the corresponding one of the reflecting members in such a manner as to surround the corresponding one of the light sources, may be filled with a liquid transparent material. With this configuration, since light rays having been emitted from the light sources enter the light introducing portions via the liquid transparent material, it is possible to suppress total reflection from an end plane, on the light source side, of each of the light introducing portions, and hence to improve the incident efficiency from the light introducing portions to the light guide plates.

In the system, a diffusion portion having a light diffusivity different from that of the light guide plates may be disposed on top surfaces of the light guide plates. With this configuration, it is possible to realize a more uniform surface light source.

In the system, a light modulation portion having a dot pattern for reflecting light on the light guide plate side may be disposed between the light guide plates and the diffusion portion, the dot pattern being preferably formed in such a manner that a dot pattern density is changed in the direction apart from each of the light sources. With this configuration, light rays emerged from the light guide plates are irregularly reflected from the dot pattern, and the light rays reflected from the bottom surfaces of the light guide plates are reflected from the light diffusion plate and further reflected from the dot pattern. Accordingly, it is possible to obtain a more uniform light distribution on the top surface of the surface light source.

In particular, the dot pattern may be configured such that the density of the reflection dot pattern becomes higher at a portion closer to the light source and becomes gradually lower at a portion farther apart from the light source. With this configuration, since a portion having a high light quantity is eliminated, it is possible to effectively prevent occurrence of luminous lines.

In the system, the light modulation portion may be formed by printing a light modulation material on the back surface of a diffusion plate constituting the diffusion portion. With this configuration, the light modulation portion can be formed by relatively simple means.

In the system, the light guide plates may be integrated with each other, and each of the light introducing portions may be formed separately from the corresponding one of the light guide plates and be optically connected to an end plane, on the light source side, of the light guide plate. With this configuration, since the separate light introducing portions can be easily, optically connected to the integral type light guide plates of the related art surface light source system, it is possible to reduce the production cost of the system.

In the system, each of the light introducing portions may be optically connected to an end plane, on the light source side, of the corresponding one of the light guide plates by means of a liquid transparent material. With this configuration, since light rays having been emitted from the light sources enter the light introducing portions via the liquid transparent material, it is possible to suppress total reflection from an end plane, on the light source side, of each of the light introducing portions.

In the system, a space, which is formed between an end plane, on the light source side, of each of the light guide plates and the corresponding one of the reflecting members in such a manner as to surround the corresponding one of the light sources, may be filled with the liquid transparent material for forming each of the light introducing portions. With this configuration, it is possible to easily provide the light introducing portions on the related art surface light source system by filling a space between an end plane, on the light source side, of each light introducing portion and the corresponding reflecting member with the liquid transparent material, and hence to reduce the production cost of the system.

In the system, each of the light guide plates may be formed separately from the corresponding one of the light sources; each of the light introducing portions be formed integrally with the corresponding one of the light guide plates; and the light guide plates be optically connected to each other. With this configuration, since each light introducing portion is formed integrally with the corresponding light guide plate, it is possible to reduce the number of parts and production steps and further facilitate the assembling step, and hence to reduce the production cost of the system.

In the system, a diffusion plate having a light diffusivity different from that of the light guide plates may be disposed on top surfaces of the light guide plates, and the light guide plates be fixedly held by the diffusion plate to be thereby integrated with each other. With this configuration, the light guide plates are connected to each other by the diffusion plate, and since the diffusion plate has a light diffusivity different from that of the light guide plates, it is possible to realize a more uniform surface light source.

In the system, a shielding member may be disposed at a boundary plane between a leading end plane of each of the light guide plates and the next one of the light guide plates. With this configuration, since the incidence of one light guide plate on the next light guide plate is shielded by the shielding member, it is possible to eliminate unevenness of luminance due to leakage of light rays from the next light guide plate.

In the system, the shielding member is tilted at a tilt angle being nearly equal to a critical angle determined by a refractive index of a transparent material for forming the light guide plates and the light introducing portions. With this configuration, the light rays reaching the top surface of the next light guide plate along the shielding member are less subjected to total reflection, it is possible to suppress occurrence of shades due to the shielding members, and hence to obtain a uniform luminance.

In the system, the light guide plates may be formed in such a manner that leading ends thereof in the traveling direction of light extend to the same position. With this configuration, since the boundaries between the light guide plates are not exposed from the top surfaces of the light guide plates, it is possible to eliminate occurrence of luminous lines and shades due to the boundaries.

In the system, each of the light introducing portions may have on its top surface a stepped portion for receiving a leading end of the front side light guide plate, and the stepped portion be tiled at a tilt angle nearly equal to a critical angle determined by a refractive index of a material for forming the light introducing portions. With this configuration, since light rays reaching the top surface of the next light guide plate along the stepped portion are less subjected to total reflection, it is possible to suppress occurrence of shades due to the shielding members, and hence to obtain a uniform luminance.

In this way, according to the first aspect of the present invention, since the light introducing portions are provided on the end planes, on the light source sides, of the second and later light guide plates, it is possible to suppress light rays from the light sources from being directly emerged upwardly from the light guide plates. This makes it possible to suppress occurrence of high luminous lines at ends and their neighborhoods, on the light source sides, of the light guide plates, and hence to obtain a uniform luminance over the surfaces of the light guide plates.

To achieve the above object, according to a second aspect of the present invention, there is provided a surface light source system including: a plurality of bar-like light sources disposed in parallel to each other; reflecting members, each of which is disposed to surround a right or left side, an upper side, and a lower side of the corresponding one of the light sources; light guide plates made from a transparent material, each of which is disposed along the left or right side of the corresponding one of the light sources, and is formed into a taper shape in cross-section along the traveling direction of light; and reflecting sheets, each of which is disposed on the back surface of the corresponding one of the light guide plates; wherein a diffusion portion having a light diffusivity larger than that of the interiors of the light guide plates is provided on the light guide plates.

With this configuration, the system functions as a surface light source as follows. Light rays enter the diffusion portion directly or indirectly, that is, by way of reflection from the inner surfaces of the reflecting members, being irregularly reflected from the diffusion portion, and enter the light guide plates. The light rays having entered the light guide plates travel throughout the light guide plates while being repeatedly subjected to total reflection from the top surfaces of the light guide plates and to reflection from the reflection sheets located on the back surfaces of the light guide plates, and are emerged from the top surfaces of the light guide plates.

Since the light rays having entered the light guide plates are made incident on the diffusion portion disposed thereon, they are not directly emerged from the top surfaces of the light guide plates. As a result, it is possible to suppress occurrence of locally high luminous lines at ends and their neighborhoods, on the light source sides, of the light guide plates, which luminous lines have occurred in the related art system. This makes it possible to prevent occurrence of unevenness of luminance and hence to obtain a uniform luminance over the surfaces of the light guide plates.

DETAILED DESCRIPTION OF THE PREFERRED EMBODIMENTS

Hereinafter, preferred embodiments of the present invention will be described in detail with reference to FIGS. 2 to 21.

[First Embodiment]

Figure 1A:
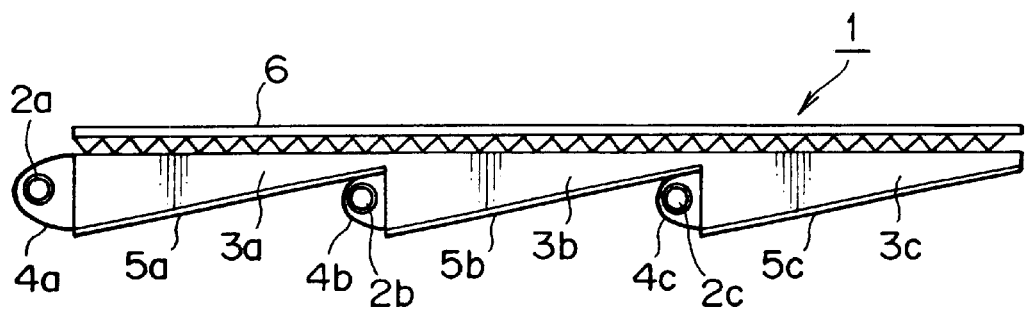
FIG. 1A is a schematic sectional view of one example of a related art surface light source system.
Figure 1B:
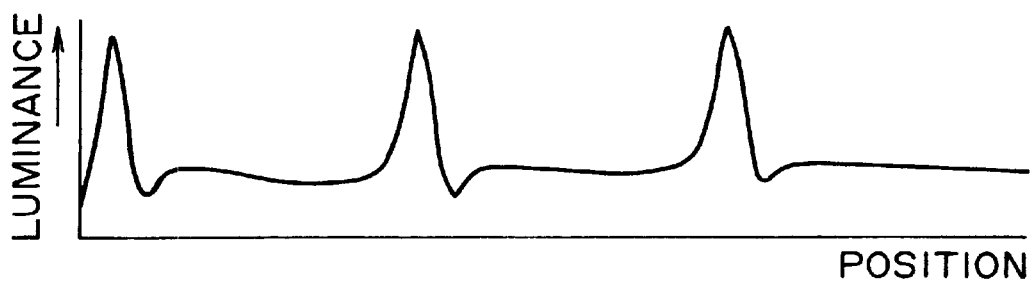
FIG. 1B is a graph showing a luminance distribution of the system shown in FIG. 1A.
Figure 2:
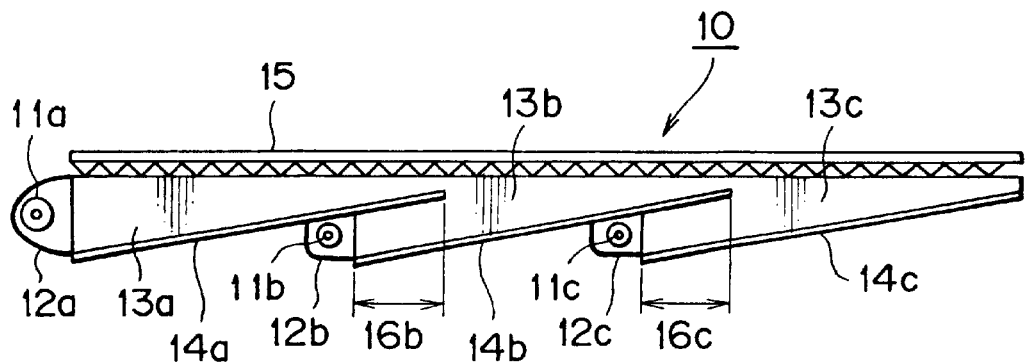
FIG. 2 is a sectional view showing a first embodiment of a surface light source system according to the present invention.
Figure 3:
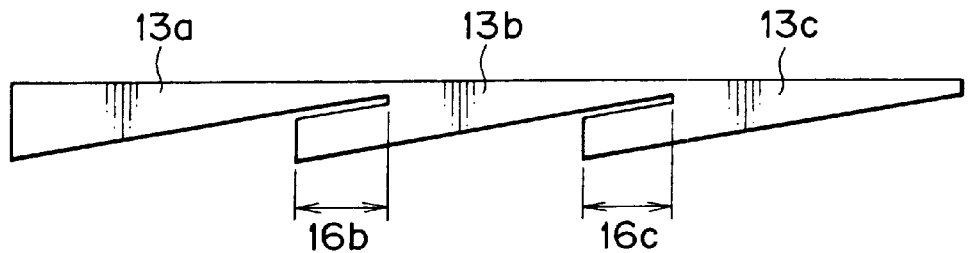
FIG. 3 is a sectional view showing light guide plates and light introducing portions of the surface light source system shown in FIG. 2.
Figure 4:
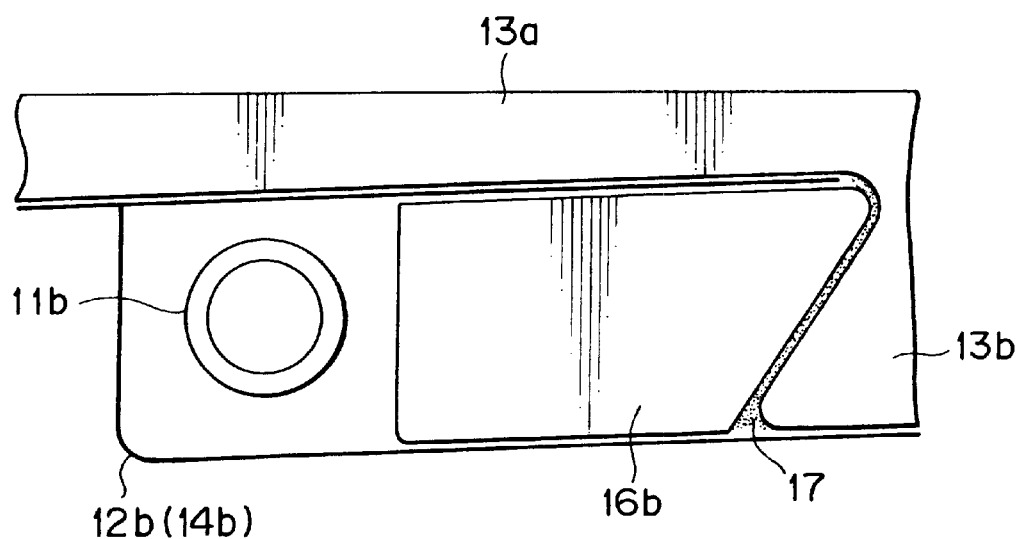
FIG. 4 is a partial enlarged sectional view showing a detail configuration of the light introducing portion of the surface light source system shown in FIG. 2.

FIGS. 2 to 4 show a configuration of a first embodiment of a surface light source system according to the present invention.

Referring to FIG. 2, there is shown a tandem type surface light source system 10 including a plurality (three in FIG. 2) of fluorescent tubes 11a, 11b, and 11c as bar-like light sources, which extend in the horizontal direction while being spaced at nearly equal intervals in parallel to each other; reflectors 12a, 12b, and 12c as reflecting members disposed in such a manner as to surround one-sides (left sides in FIG. 2), upper sides, and lower sides of the fluorescent tubes 11a, 11b, and 11c; light guide plates 13a, 13b, and 13c extending along the other sides (right sides in FIG. 2) of the fluorescent tubes 11a, 11b, and 11c; reflecting sheets 14a, 14b, and 14c disposed on the back sides of the light guide plates 13a, 13b, and 13c; and a lens sheet 15 disposed overall on the top surfaces of the light guide plates 13a, 13b, and 13c.

With respect to each of the light guide plates 13a, 13b, and 13c, the light guide plate disposed on the left side thereof is called the "front side light guide plate", and the light guide plate disposed on the right side thereof is called the "rear side light guide plated". For example, with respect to the light guide plate 13b, the light guide plate 13a is called the "front side light guide plate" and the light guide plate 13c is called the "rear side light guide plate".

Each of the fluorescent tubes 11a, 11b, and 11c is a known bar-like fluorescent tube, which is configured such that vapor gas of mercury is enclosed in a straight glass tube (for example, inside diameter: 1.4 mm and outside diameter: 1.8 mm) including a coating film of a fluorescent material on the inner peripheral surface and discharge electrodes (not shown) are provided at both inner ends of the tube.

The light source is not limited to that described above but may be any light source insofar as it is formed into a bar-like shape having an approximately circular cross-section and extending in one direction and it has a light emitting portion therein.

Each of the reflectors 12a, 12b, and 12c is formed of a thin plate having a thickness of typically 0.2 mm, and has, on at least inner surface thereof, a white-colored reflective coating film or paint film.

The light guide plates 13a, 13b, and 13c in this embodiment form one light guide plate 13. In other words, each of the light guide plates 13a, 13b, and 13c is a portion of the one-body light guide plate 13.

The light guide plate 13 is configured as a transparent light guide plate made from a transparent material such as colorless, transparent acrylic resin, or a light scattering light guide plate. The left end face of each of the light guide plates 13a, 13b, and 13c, opposed to the corresponding one of the fluorescent tubes 11a, 11b, and 11c, acts as a light guide face, and the top surface thereof acts as a light radiation face.

In each of the light guide plates 13a, 13b, and 13c in this embodiment, the bottom surface is tilted with the thickness, 4 mm at one side, becoming thinner toward the other side for a length of 100 mm. That is to say, each of the light guide plates 13a, 13b, and 13c is formed into a wedge shape in cross-section. These light guide plates 13a, 13b, and 13c are arranged in series and are integrally joined to each other. of the light guide plates 13a, 13b, and 13c, at least the second and later light guide plates 13b and 13c have, as shown in FIG. 3, light introducing portions 16b and 16c (configured as will be described later) adjoining to the end faces (light incident faces), on the sides of the fluorescent tubes 11b and 11c, of the light guide plates 13b and 13c.

Each of the reflecting sheets 14a, 14b, and 14c has, on its inner surface, a white-colored reflective coating film or a paint film like the reflectors 12a, 12b, and 12c, and typically, it is configured as a reflecting sheet formed of a silver thin film having a thickness of 0.057 mm. Light rays emerged downwardly from the bottom surfaces of the light guide plates 13a, 13b, and 13c are reflected from the reflecting sheets 14a, 14b, and 14c and are returned again into the light guide plates 13a, 13b, and 13c.

The lens sheet 15 has micro-lenses distributed on the back surface opposed to the light guide plates 13a, 13b, and 13c. Light rays emerged obliquely from the light guide plates 13a, 13b, and 13c are refracted upwardly by the micro-lenses of the lens sheet 15.

Each of the light introducing portions 16b and 16c, which is made from a transparent material, is integrated with the light incident face of the corresponding one of the light guide plates 13b and 13c to be thus optically connected thereto.

In terms of easy production, each of the light introducing portions 16b and 16c is configured as follows:

The light introducing portions 16b and 16c have the same configuration, and therefore, description will be made by example of the light introducing portion 16b with reference to FIG. 4.

Referring to FIG. 4, the light introducing portion 16b, which is preferably made from the same transparent material as that for the light guide plate 13b, for example, an acrylic resin, is formed separately from the light guide plate 13b.

The light introducing portion 16b is closely bonded to the light guide plate 13b by filling the boundary portion between the light introducing portion 16b and the light guide plate 13b with a transparent adhesive 17 made from a liquid transparent material, typically, silicone gel, to be thus optically connected thereto.

In this case, the reflector 12b as the reflecting member is formed by a portion of the reflecting sheet 14b, which portion extends along the back surface of the light introducing portion 16b and further extends curvedly around the fluorescent tube 11b, and a portion of the reflecting sheet 14a, which portion is positioned on the back surface of the light guide plate 13a at the leading end and its neighborhood and is thereby positioned over the fluorescent tube 11b.

The function of the surface light source system 10 in this embodiment having the above configuration will be described below. When a drive power is supplied from a drive circuit (not shown) to each of the fluorescent tubes 11a, 11b, and 11c, discharge occurs between the discharge electrodes, whereby the coating film of a fluorescent material on the inner surface of the glass tube is made luminous.

Light rays thus emerged from the fluorescent tubes 11a, 11b, and 11c travel ahead directly or indirectly, that is, by way of reflection from the inner surfaces of the reflectors 12a, 12b, and 12c, and enter the light guide plates 13a, 13b, and 13c directly or via the light introducing portions 16b and 16c. In this case, if each of the light introducing portions 16b and 16c is made from a material having the same refractive index as that of the corresponding one of the light guide plates 13b and 13c, light rays enter the light guide plates 13b and 13c while traveling ahead without refraction, to thereby reduce the loss in light.

Of the light rays having entered the light guide plates 13a, 13b, and 13c, only the least part are directly emerged from the top surfaces of the light guide plates 13a, 13b, and 13c; and most of the angled components are repeatedly subjected to total reflection from the top and bottom surfaces of the light guide plates 13a, 13b, and 13c, and part of the angled components are emerged downwardly from the back surfaces of the light guide plates 13a, 13b, and 13c, being reflected from the reflecting sheets 14a, 14b, and 14c to be returned again in the light guide plates 13a, 13b, and 13c, whereby the angled components of the light rays travel throughout the light guide plates 13a, 13b, and 13c, which angled components are then emerged overall from the top surfaces of the light guide plates 13a, 13b, and 13c, and are refracted upwardly by the lens sheet 15 and emerged upwardly therefrom, to light a liquid crystal display or the like (not shown) from the back surface.

In this case, the light rays from the fluorescent tubes 11b and 11c enter the second and later light guide plates 13b and 13c via the light introducing portions 16b and 16c. Accordingly, of the light rays reflected from the bottom surfaces of the light introducing portions 16b and 16c, part directly reaching the top surfaces of the light guide plates 13b and 13c are made incident thereon at sufficient large incident angles, to be thereby subjected to total reflection. As a result, it is possible to suppress a phenomenon in which luminance becomes significantly high at the light incident end faces and their neighborhoods of the light guide plates, which phenomenon has occurred in the related art tandem type surface light source system, and hence to reduce the loss in light and obtain a uniform luminance distribution.

According to this embodiment, since the portion, positioned over the fluorescent tube 11b (or 11c), of the reflector 12b (or 12c) is formed by the portion of the reflecting sheet 14a (or 14b), a gap between the light introducing portion 16b (or 16c) and the back surface of the leading end portion of the light guide plate 13a (or 13b) becomes thin, it is possible to realize the function of the reflector 12b (or 12c) without occurrence of a step due to the reflector; and since the portion, extending from the one side (left side) to the lower side of the fluorescent tube 11b (or 11c), of the reflector 12b (or 12c) is formed by the portion, extending along the back surface of the light guide plate 13b (or 13c), of the reflecting sheet 14b (or 14c), that is, the reflector 12b (or 12c) is integrated with the reflecting sheet 14b (or 14c), it is possible to eliminate occurrence of a shade due to a step or the like at the boundary between the reflector 12b (or 12c) and the reflecting sheet 14b (or 14c).

In the surface light source system 10 shown in FIG. 2, a space between each of the fluorescent tubes 11a, 11b, and 11c and the corresponding one of the reflectors 12a, 12b, and 12c is vacant; however, such a space may be filled with a transparent liquid material such as silicone gel, followed by hardening thereof.

The transparent material used for fill the space may be selected to have a refractive index equal to or nearly equal to that of the light guide plate 13a and the light introducing portions 16b and 16c. In this case, it is possible to eliminate the refraction of light rays incoming from the fluorescent tubes 11a, 11b, and 11c into the light guide plate 13a and the light introducing portions 16b and 16c, and hence to further reduce the loss in light.

Figure 5:
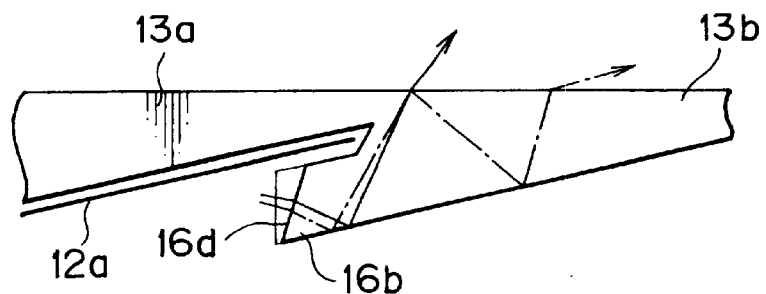
FIG. 5 is a schematic sectional view showing a first variation of the light introducing portion of the surface light source system shown in FIG. 2.

FIG. 5 shows a first variation of the configuration of the light introducing portions 16b and 16c in the surface light source system 10.

Light introducing portions 16a and 16b in the first variation have the same configuration, and therefore, description will be made by example of the light introducing portion 16b. Referring to FIG. 5, the light introducing portion 16b has a light incident face 16d, the upper end of which is tilted forwardly, that is, in the light traveling direction.

With this configuration, light rays from the fluorescent tube 11b are, as shown in solid lines in FIG. 5, refracted downwardly by the light incident face 16d of the light introducing portion 16b and then subjected to total reflection from the bottom surface of the light introducing portion 16b, whereby the light rays are made incident on the top surface of the light guide plate 13b at small incident angles.

Accordingly, the light rays from the fluorescent tube 11b pass upwardly through the boundary between the light guide plates 13a and 13b and its neighborhood, so that it is possible to suppress occurrence of shades at the boundary and its neighborhood and hence to obtain a more uniform luminance distribution as a whole.

On the contrary, if the light incident face of the light introducing portion 16b is upright to the top surface of the light guide plate 13b, as shown in chain lines in FIG. 5, the light rays having been subjected to the bottom surface of the light introducing portion 16b are made incident on the top surface of the light guide plate 13b at relatively large incident angles, to be thereby subjected to total reflection therefrom. As a result, the light rays from the fluorescent tube 11b are subjected to total reflection from the boundaries and their neighborhoods of the light guide plates 13a and 13b, so that shades occur at the boundaries and their neighborhoods, to cause uneven luminance portions in the luminance distribution of the surface light source system 10.

Figure 6:
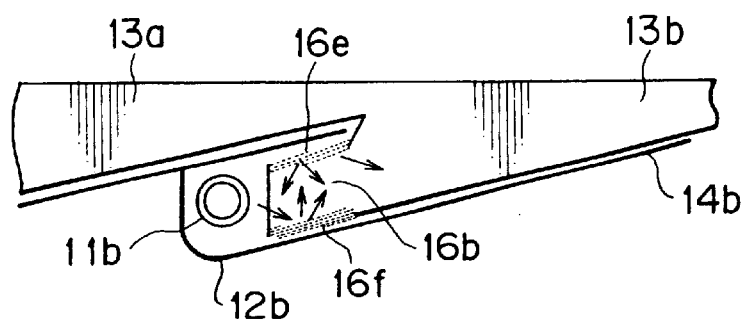
FIG. 6 is a schematic sectional view showing a second variation of the light introducing portion of the surface light source system shown in FIG. 2.

FIG. 6 shows a second variation of the configuration of the light introducing portions 16b and 16c.

Light introducing portions 16b and 16c in the second variation have the same configuration, and therefore, description will be made by example of the light introducing portion 16b. Referring to FIG. 6, the light introducing portion 16b has a top surface 16e and a bottom surface 16f, each of which is subjected to a coarsening treatment.

With this configuration, as shown in FIG. 6, light rays from the fluorescent tube 11b enter the light introducing portion 16b, which light rays are irregularly reflected from the top surface 16e and the bottom surface 16f and then made incident on the top surface of the light guide plate 13b at various incident angles. As a result, part of the light rays from the fluorescent tube 11b pass upwardly through the boundary between the light guide plates 13a and 13b and its neighborhood, so that it is possible to suppress occurrence of shades at the boundary and its neighborhood, and hence to obtain a more uniform luminance distribution as a whole.

Figure 7:
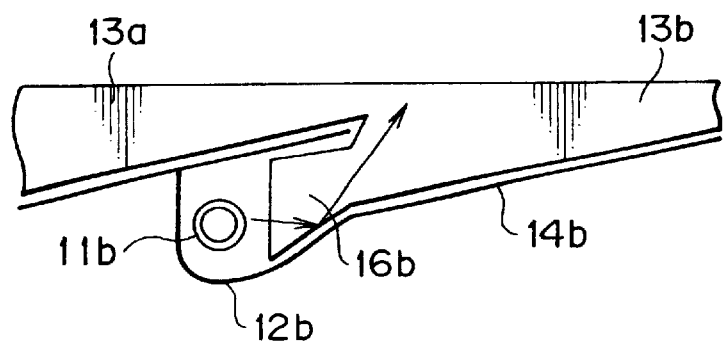
FIG. 7 is a schematic sectional view showing a third variation of the light introducing portion of the surface light source system shown in FIG. 2.

FIG. 7 shows a third variation of the configuration of the light introducing portions 16b and 16c.

Light introducing portions 16b and 16c in the third variation have the same configuration, and therefore, description will be made by example of the light introducing portion 16b. Referring to FIG. 7, the light introducing portion 16b is formed into a taper shape in cross-section.

With this configuration, as shown in FIG. 7, light rays from the fluorescent tube 11b enter the light introducing portion 16b, which light rays are subjected to total reflection from the top surface and the surface of the light introducing portion 16b, and then made incident on the top surface of the light guide plate 13b at small incident angles. As a result, the light rays from the fluorescent tube 11b pass upwardly through the boundary between the light guide plates 13a and 13b and its neighborhood, so that it is possible to suppress occurrence of shades at the boundary and its neighborhood, and hence to obtain a more uniform luminance distribution as a whole.

Additionally, in the configuration shown in FIG. 2, a light diffusion plate (not shown) having a light diffusion action identical to or different from that of the light guide plate 13 may be disposed between the top surfaces of the light guide plates 13a, 13b and 13c constituting the light guide plate 13 and the lens sheet 15.

With this configuration, the light rays traveling upwardly from the light guide plates 13a, 13b, and 13c in FIG. 2 are made more uniform in the planar direction, to uniformly travel to the lens sheet 15.

[Second Embodiment]

Figure 8:
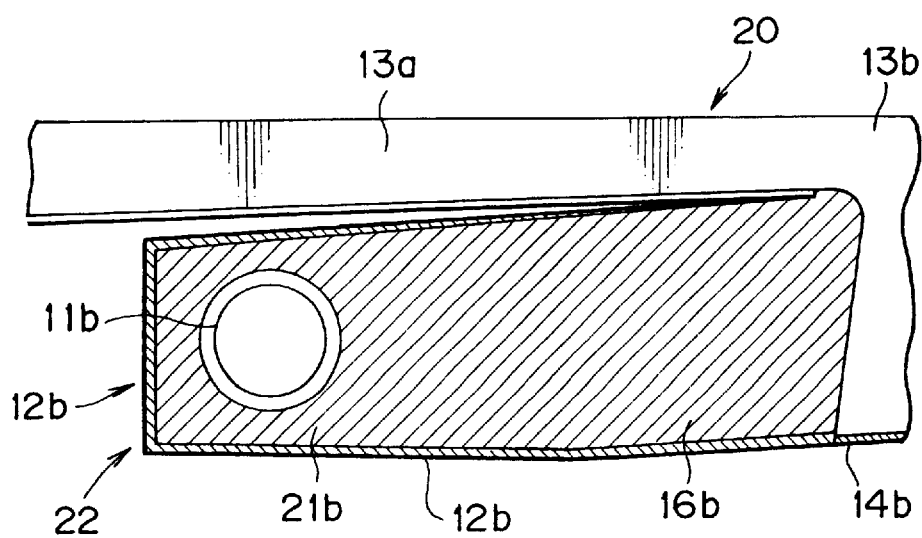
FIG. 8 is a partial enlarged sectional view showing an essential portion of a second embodiment of the surface light source system according to the present invention.

FIG. 8 shows a second embodiment of the surface light source system according to the present invention.

In FIG. 8, which is an enlarged partial view showing only a region of a light guide plate 13b, parts corresponding to those shown in FIG. 2 are designated by the same characters, and the overlapped description thereof is omitted. Here, only the difference between a surface light source system 20 according to the second embodiment and the surface light source system 10 according to the first embodiment will be described with reference to FIG. 8.

In the surface light source system 20, spaces surrounded by fluorescent tubes 11a, 11b, and 11c, reflectors 12a, 12b, and 12c, and light guide plates 13a, 13b, and 13c are filled with fillers 21a, 21b and 21c (only the filler 21b is shown) made from a transparent material such as hardened silicone gel. The fillers 21b and 21c integrally form light introducing portions 16b and 16c.

Accordingly, the light introducing portions 16b and 16c made from the fillers 21b and 21c are optically connected to light incident faces of the light guide plates 13b and 13c.

In this embodiment, each of the reflectors 12b and 12c is formed of a PET (polyethylene terephthalate) material having a thickness of 0.05 mm and has, on part of the inner surface, a reflecting film 22 formed of a silver deposition layer or a white-colored reflective coating film or paint film. As shown in FIG. 8, a reflecting sheet 14b disposed on the back surface of the light guide plate 13b extends to a portion, not provided with the reflecting film 22, of the back surface of the reflector 12b.

According to the surface light source system 20 having the above configuration, light rays emitted from the fluorescent tubes 11a, 11b, and 11c travel ahead directly via the fillers 21a, 21b, and 21c or indirectly, that is, by way of reflection from the inner surfaces of the reflectors 12a, 12b, and 12c via the fillers 21a, 21b, and 21c, and enter the light guide plates 13a, 13b, and 13c directly or via the light introducing portions 16b and 16c. In this case, if each of the fillers 21a, 21b, and 21c is made from a material having the same refractive index as that of the corresponding one of the light guide plates 13a, 13b and 13c, light rays enter the light guide plates 13a, 13b and 13c while traveling ahead without refraction, to thereby reduce the loss in light.

The light rays having entered the light guide plates 13a, 13b, and 13c travel throughout the light guide plates 13a, 13b, and 13c like the surface light source system 10, being emerged overall from the top surfaces of the light guide plates 13a, 13b, and 13c, and are refracted upwardly by the lens sheet 15 and emerged upwardly therefrom, to light a liquid crystal display or the like (not shown) from the back surface.

In this case, the light rays from the fluorescent tubes 11b and 11c enter the second and later light guide plates 13b and 13c via the light introducing portions 16b and 16c. Accordingly, of the light rays reflected from the bottom surfaces of the light introducing portions 16b and 16c, part directly reaching the top surfaces of the light guide plates 13b and 13c are made incident thereon at sufficient large incident angles, to be thereby subjected to total reflection. As a result, it is possible to suppress a phenomenon in which luminance becomes significantly high at the light incident end faces and their neighborhoods of the light guide plates, which phenomenon has occurred in the related art tandem type surface light source system, and hence to reduce the loss in light and obtain a uniform luminance distribution.

[Third Embodiment]

Figure 9:
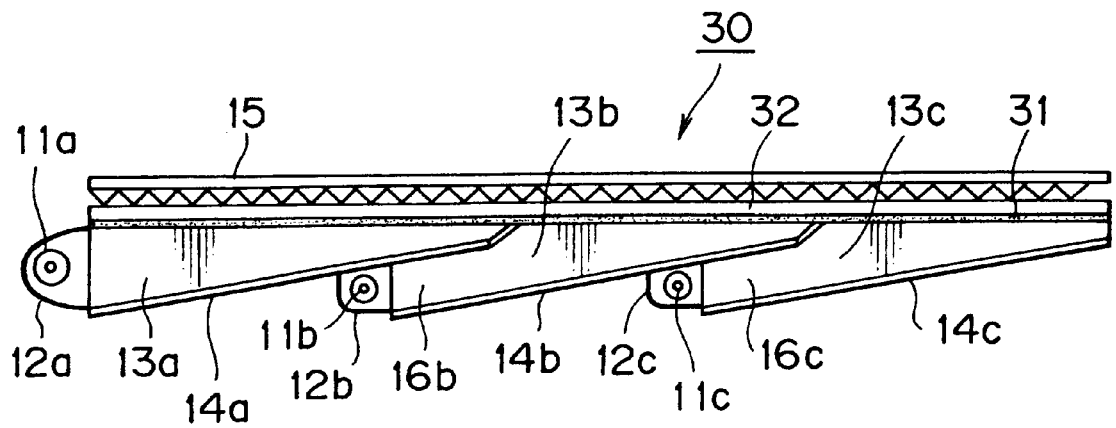
FIG. 9 is a schematic sectional view showing a third embodiment of the surface light source system according to the present invention.
Figure 10:
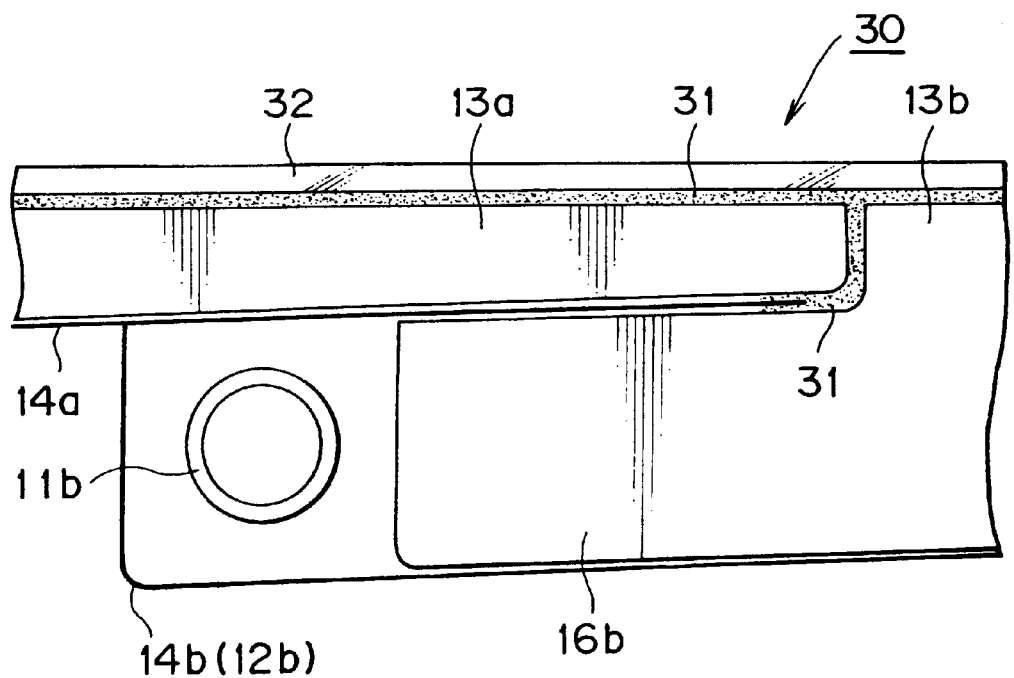
FIG. 10 is a partial enlarged sectional view showing a detail configuration of the light introducing portion of the surface light source system shown in FIG.

FIGS. 9 and 10 show a third embodiment of the surface light source system according to the present invention.

In FIGS. 9 and 10, parts corresponding to those shown in FIGS. 2 and 4 are designated by the same characters, and the overlapped description thereof is omitted. Here, only a difference between a surface light source system 30 according to the third embodiment and the surface light source system 10 will be described with reference to FIGS. 9 and 10.

In the surface light source system 30, light guide plates 13a, 13b, and 13c are formed separately from each other, and light introducing portions 16b and 16c are integrated with the light guide plates 13b and 13c.

As shown in FIG. 10, the leading end face of the light guide plate 13a is substantially upright to the top surface thereof, and the light introducing portion 16b is optically connected to the vertical leading end and its neighborhood of the light guide plate 13a with a transparent adhesive 31 such as silicone gel.

A transparent film 32 (or light diffusion plate) is placed on the top surfaces of the light guide plates 13a, 13b, and 13c, and is fixedly held thereon with the transparent adhesive 31.

According to the surface light source system 30 having the above configuration, since the light introducing portions 16b and 16c are integrated with the light guide plates 13b and 13c, it is possible to simplify the production process and reduce the production cost, and since the boundary portions between the light guide plates 13a, 13b, and 13c are filled with the transparent adhesive 31 and the surfaces of the light guide plates 13a, 13b, and 13c are covered with the transparent adhesive 31 and the transparent film 32, the light guide plates 13a, 13b, and 13c are optically connected to each other.

Accordingly, the surface light source system 30 exhibits the same function as that of the surface light source system 10 shown in FIG. 2, and further exhibits the effect of eliminating shades at the boundary portions between the light guide plates 13a, 13b, and 13c because of no refraction and reflection of light at the boundary portions.

Figure 11:
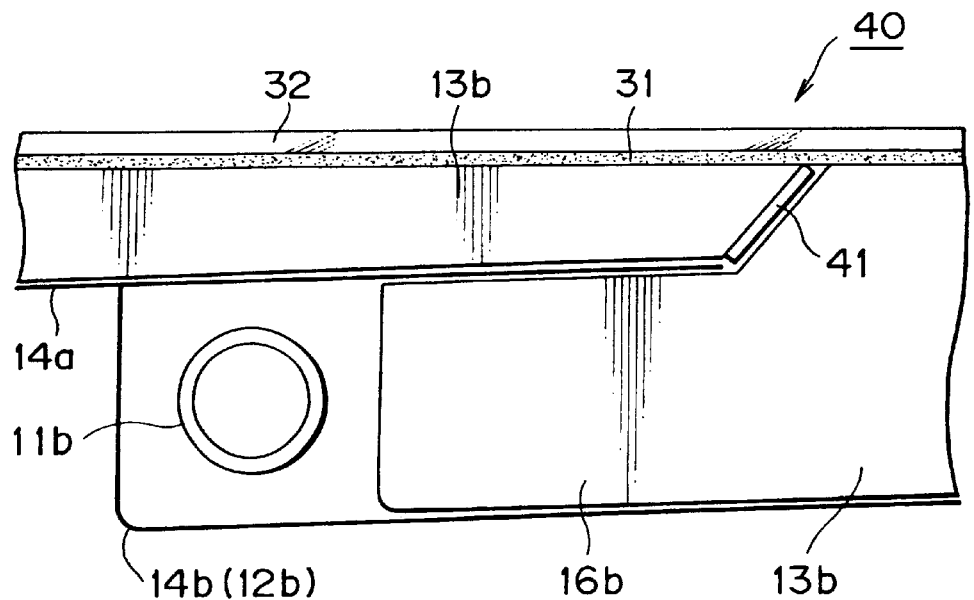
FIG. 11 is a partial enlarged sectional view showing a first variation of the light introducing portion of the surface light source system shown in FIG. 9.
Figure 12:
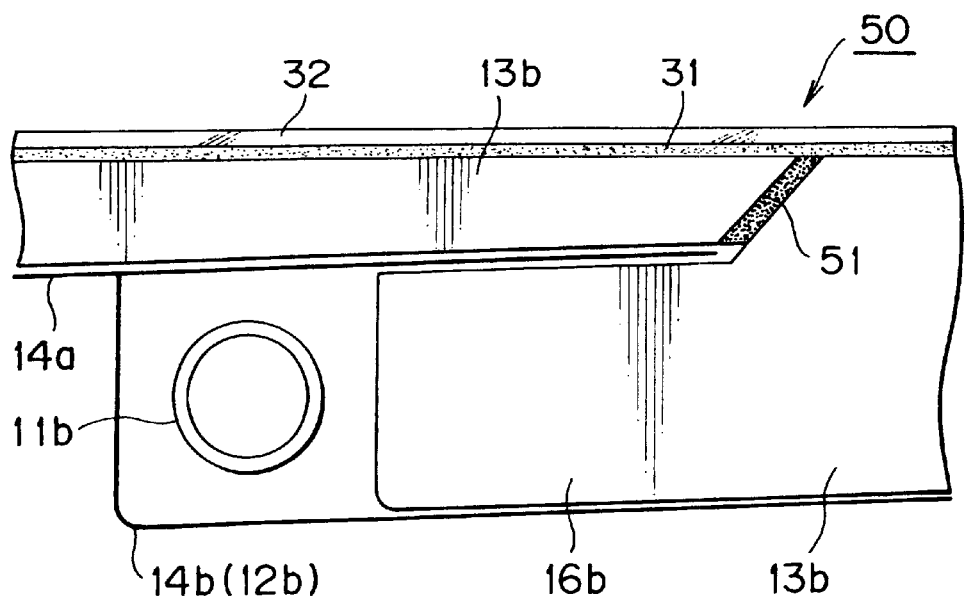
FIG. 12 is a partial enlarged sectional view showing a second variation of the light introducing portion of the surface light source system shown in FIG. 9.

FIGS. 11 and 12 show first and second variations of the surface light source system 30. As shown in these figures, each of a surface light source system 40 as the first variation and a surface light source system 50 as the second variation is configured such that the leading end face of each of light guide plates 13a and 13b is not upright but is tilted with its upper end fallen forwardly.

In the surface light source system 40 as the first variation shown in FIG. 11, the above-described leading end face is provided with a shielding layer 41 formed of a shielding member made from a blackened light absorbing material.

In the surface light source system 50 as the second variation shown in FIG. 12, a gap between the above-described leading end face and a tilt surface formed on a portion, opposed to the leading end face, of the light guide plate 13c is filled with a shielding adhesive 51.

Figure 13:
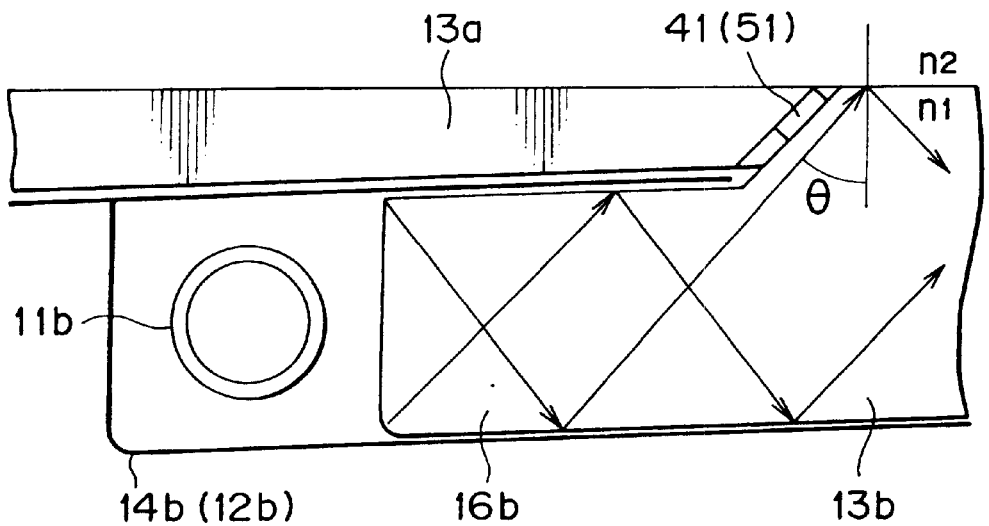
FIG. 13 is a partial enlarged sectional view showing the traveling direction of light in each of the light introducing portions shown in FIGS. 11 and 12.

In this case, as shown in FIG. 13, the tilt angle of the above-described leading end face is preferably set to a critical angle θ determined by a refractive index n1 of a material forming the light guide plate 13b.

Letting the refractive index of a medium present on the upper side of the light guide plate 13b be n2, the critical angle θ is given by the following equation:

$$\sin \theta = n2/n1 \qquad (1)$$

Assuming that the light guide plate 13b is made from an acrylic resin (n1=1.49) and the medium present on the upper side thereof is air (n2=1.0), the critical angle θ becomes about 42°.

Accordingly, as shown in FIG. 13, light rays, which have entered the light introducing portion 16b from the fluorescent tube 11b, being subjected to total reflection from the bottom surface of the light introducing portion 16b, and reached the top surface of the light guide plate 13b along the above leading end face, are not subjected to total reflection but are emerged upwardly. That is to say, the light rays are not shielded by the shielding layer 41 or the shielding adhesive 51. As a result, it is possible to eliminate occurrence of shades due to the shielding layer 41 or the shielding adhesive 51, and hence to obtain a more uniform luminance distribution as a whole.

Additionally, in the surface light source system 30 shown in FIG. 9, one transparent plate (not shown) having a specific thickness and having on its top surface a light diffusion layer may be disposed on the light guide plates 13a, 13b, and 13c separated from each other, and the light guide plates 13a, 13b, and 13c be connected to each other by the transparent plate. With this configuration, the light guide plates 13a, 13b, and 13c separated from each other can be optically connected to each other by the transparent plate, and light rays traveling upwardly from the light guide plates 13a, 13b, and 13c in FIG. 9 can be made more uniform in the planar direction by the light diffusion layer provided on the top surface of the transparent plate, to thereby obtain a luminance distribution being more uniform in the planar direction.

The diffusion layer and the transparent plate may be configured as a one-body diffusion plate.

The total thickness of the diffusion layer and the transparent plate or the thickness of the diffusion plate is preferably larger than that of a thinnest portion of the light guide plate. With this configuration, it is possible to further suppress uneven luminance portions occurring at the light source portions (fluorescent tubes) and their neighborhoods, and hence to obtain a uniform luminance distribution as a whole.

[Fourth Embodiment]

Figure 14:
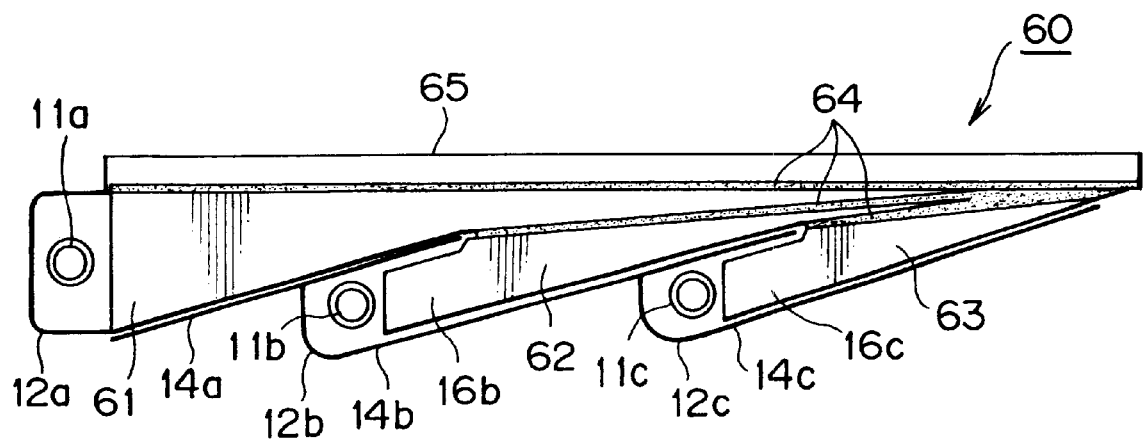
FIG. 14 is a schematic sectional view showing a fourth embodiment of the surface light source system according to the present invention.

FIG. 14 shows a fourth embodiment of the surface light source system according to the present invention.

In FIG. 14, parts corresponding to those shown in FIG. 9 are designated by the same characters, and the overlapped description thereof is omitted. Referring to this figure, there is shown a surface light source system 60 as the fourth embodiment, which is different from the surface light source system 30 shown in FIG. 9 in that light guide plates 61, 62, and 63 are formed separately from each other, and the leading ends of the light guide plates 61, 62, and 63 extend to the same position, that is, to the leading end of the foremost light source plate 63.

The top surface of the light guide plate 62 (or 63) is tilted, and is optically connected to the back surface of the leading end portion, located on the top surface of the light guide plate 62 (or 63), of the light guide plate 61 (or 62) with a transparent adhesive 64. A transparent film (or light diffusion plate) 65 is placed on the top surface of the light guide plate 61, and is fixedly held thereon with the transparent adhesive 64.

According to the surface light source system 60 having the above configuration, since the light introducing portions 16b and 16c are integrated with the light guide plates 62 and 63, it is possible to simplify the production process and reduce the production cost, and since the boundary portions between the light guide plates 61, 62, and 63 are overlapped to each other at the leading ends, extending longer, of the light guide plates 61, 62, and 63 and are filled with the transparent adhesive 64, and the surfaces of the light guide plates 61, 62, and 63 are covered with the transparent adhesive 64 and the transparent film 65, the light guide plates 61, 62, and 63 are optically, integrally connected to each other.

Accordingly, the surface light source system 60 exhibits the same function as that of the surface light source system 10 shown in FIG. 2, and further exhibits the effect of eliminating occurrence of shades at the boundary portions because of no joints between the light guide plates 61, 62, and 63 as seen from the surface of the transparent film 65, that is, no refraction or reflection of light at the joints therebetween.

Even in the fourth embodiment shown in FIG. 14, like the variation shown in FIG. 5, since the light incident faces of the light introducing portions 16b and 16c are tilted, light rays from the fluorescent tubes 11b and 11c pass upwardly through the inlets of the light guide plates 62 and 63 and their neighborhoods, with a result that it is possible to suppress occurrence of shades at the inlets of the light guide plates 62 and 63 and their neighborhoods, and hence to obtain a more uniform luminance distribution as a whole.

[Fifth Embodiment]

Figure 15:
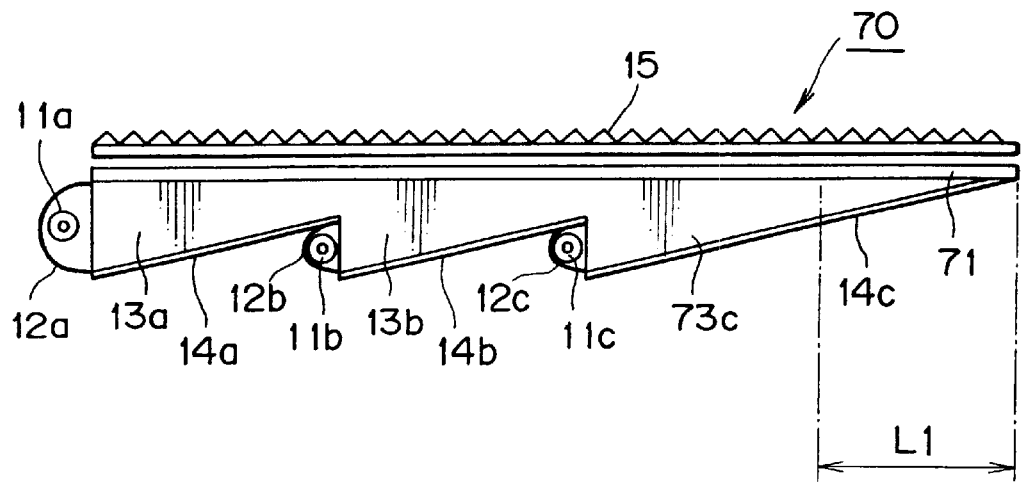
FIG. 15 is a schematic sectional view showing a fifth embodiment of the surface light source system according to the present invention.

FIG. 15 shows a fifth embodiment of the surface light source system according to the present invention.

In FIG. 15, parts corresponding to those shown in FIG. 2 are designated by the same characters and the overlapped description thereof is omitted. Referring to this figure, there is shown a surface light source system 70 as the fifth embodiment, which is different from the source light source system 10 shown in FIG. 2 in that the light introducing portions in the first embodiment are not provided, a diffusion portion 71 is provided, and a light guide plate 73c at the final stage is longer than each of other light guide plates.

Referring to FIG. 15, there is shown the surface light source system 70 including a plurality of fluorescent tubes 11a, 11b, and 11c as bar-like light sources; reflectors 12a, 12b, and 12c as reflecting members disposed in such a manner as to surround one-sides (left sides in FIG. 15), upper sides, and lower sides of the fluorescent tubes 11a, 11b, and 11c; light guide plates 13a, 13b, and 73c extending along the other sides (right sides in FIG. 15) of the fluorescent tubes 11a, 11b, and 11c; reflecting sheets 14a, 14b, and 14c disposed on the back surfaces of the light guide plates 13a, 13b, and 73c; and a lens sheet 15 disposed over the top surfaces of the light guide plates 13a, 13b, and 73c.

The surface light source system 70 further includes a diffusion portion 71 disposed on the flat top surfaces of the light guide plates 13a, 13b, and 73c integrated with each other. The diffusion portion 71 has a function of diffusing light between the light guide plates 13a, 13b, and 73c and the lens sheet 15.

The diffusion portion 71 has a light diffusivity larger than that of each of the light guide plates 13a, 13b, and 73c, and is integrally formed on the light guide plates 13a, 13b, and 73c by coating the top surfaces of the light guide plates 13a, 13b, and 73c with a light diffusive light material.

The diffusion portion 71 can be easily formed by coating the light guide plates 13a, 13b, and 73c with light diffusive ink typically by screen printing. As the material for forming the diffusion portion 71, there is preferably used the same material as that for forming the light guide plates 13a, 13b, and 73c, except that the material for the diffusion portion 71 contains the light diffusive material in an amount larger than that of the material for forming the light guide plates 13a, 13b, and 73c.

The diffusion material 71 made from the same material as that for the light guide plates 13a, 13b, and 73c except for the content of the light diffusive material is advantageous in that since the light guide plates 13a, 13b, and 73c and the diffusion portion 71 form an integral optical member and has the same light reflectance, light rays from the light sources are not reflected from the boundaries therebetween, to thereby suppress the loss in light quantity.

Since the light introducing portions provided in the previous embodiments are not provided in this embodiment, if the diffusion portion 71 is not provided, luminance becomes significantly high at the ends, on the light source sides, of the light guide plates 13a, 13b, and 73c and their neighborhoods, with a result that uneven luminance portions occur in the luminance distribution of the surface light source system 70.

In this embodiment, however, since the diffusion portion 71 is provided on the top surfaces of the light guide plates 13a, 13b, and 73c, light rays emerged from the ends, on the light source sides, of the light guide plates 13a, 13b, and 73c and their neighborhoods are not used as light rays for the surface light source but are made incident on the diffusion portion 71. The light rays having entered the diffusion portion 71 are sufficiently diffused in the diffusion portion 71, with a result that the above problem associated with the unevenness of luminance can be solved.

If the light diffusivity of the diffusion portion 71 is made much higher than that of each of the light guide plates 13a, 13b, and 73c by increasing the content of the light diffusive material in the diffusion portion 71, it is possible to more certainly eliminate the unevenness of luminance.

Here, the function of the diffusion portion 71 (which may be configured as a diffusion plate) is similar to that of the light guide plate containing light diffusive material; however, the use of the diffusion portion 71 is effective to increase the diffusion of light rays and eliminate uneven luminance portions at regions near the light sources as compared with the use of only the light guide plate containing the light diffusive material. Alternatively, if the light guide plate contains the light diffusive material, the use of the diffusion portion 71 is effective to lower the concentration of the light diffusive material in the light guide plate, and hence to obtain a more uniform luminance distribution as a whole.

In this regard, the surface light source system using the combination of the light guide plates 13a, 13b, and 73c formed of a transparent member not containing any light diffusive material and the diffusion portion 71 can exhibit the same effect as that of a surface light source system using light guide plates formed of a member containing a light diffusive material without the diffusion portion 71.

The light diffusivity of the diffusion portion 71 can be made higher by making the thickness of the diffusion portion 71 thicker. This is effective to more certainly eliminate the unevenness of luminance. When the thickness of the diffusion portion 71 is made thicker, however, the quantity of light rays, which have been reflected from the diffusion portion 71 and is reflected from the reflecting sheet 14a, is increased, resulting in the degraded efficiency. Accordingly, it is required to determine the light diffusivity and the thickness of the diffusion portion 71 in consideration of various conditions.

The increasing thickness of the diffusion portion 71 enlarges the entire system, and therefore, there is a limitation in increasing the thickness of the diffusion portion 71. However, as compared with the use of light guide plates formed of a member containing a light diffusive material, the use of the diffusion portion 71 having a large thickness is advantageous in that since light rays from the light sources are reflected from the light guide plate and the diffusion portion having the large thickness, the quantity of the light rays made incident on the next light guide plate is increased, with a result that it is possible to effectively prevent occurrence of an inconvenience that differences in color between materials for forming the light guide plates and the diffusion portion form uneven color portions in the surface light source system.

According to this embodiment, as shown in FIG. 15, the final light guide plate 73c is longer than each of the other light guide plates 13a and 13b by a length of L1. If the length of the final light guide plate 73c is the same as that of each of the light guide plates 13a and 13b, a quantity of light rays possessed by the light guide plate 73c, which is to be made incident on the next light guide plate, becomes useless. To be more specific, the light guide plate 13a has a quantity of light rays to be made incident on the light guide plate 13b, and the light guide plate 13b has a quantity of light rays to be made incident on the light guide plate 73c. However, since the final light guide plate 73c is not provided with the next light guide plate, a quantity of light rays possessed by the light guide plate 73c, which is to be made incident on the next light guide plate, becomes useless. To cope with such an inconvenience, according to this embodiment, the light guide plate 73c is extended by the length of L1, to increase the lighting area of the surface light source, thereby reducing a loss in light quantity.

[Sixth Embodiment]

Figure 16:
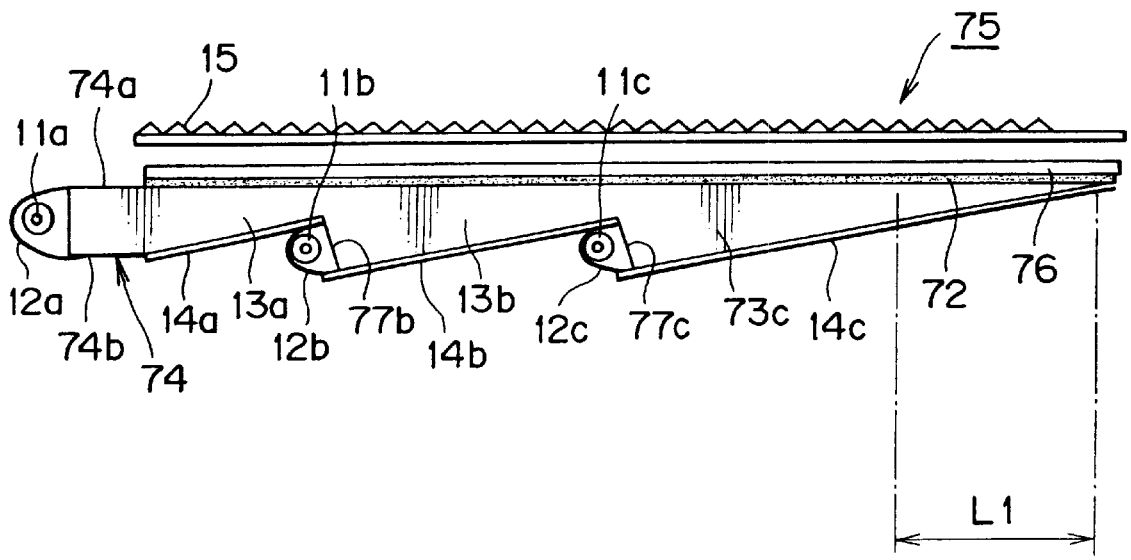
FIG. 16 is a schematic sectional view showing a sixth embodiment of the surface light source system according to the present invention.

FIG. 16 shows a sixth embodiment of the surface light source system according to the present invention.

In a surface light source system 75 shown in FIG. 16, parts corresponding to those described in the fifth embodiment are designated by the same characters and the overlapped description thereof is omitted.

The surface light source system 75 is different from the surface light source system 70 according to the fifth embodiment described with reference to FIG. 15 in that a flattened portion 74 is provided on the light source side of a first light guide plate 13a, and that end planes 77b and 77c, on which light rays from the light sources are made incident, of a second light guide plate 13b and a third light guide plate 73c are slightly tilted.

The flattened portion 74 is located outside a region in which the light guide plate 13a functions as part of a surface light source for guiding light upwardly, that is, a region in which a reflecting sheet 14a is provided, and the outer end of the flattened portion 74 is attached to a light source 11a. The flattened portion 74 has a flattened upper surface 74a and a flattened lower surface 74b. In the flattened portion 74 located on the front side from the surface light source region in which the reflecting sheet 14a is formed, light rays emitted from the light source 11a are repeatedly reflected from the flattened upper and lower surfaces 74a and 74b. As a result, it is possible to equalize a distribution of light rays, which are emitted from the light source 11a and made incident on the light guide plate 13a, in the thickness direction, and hence to realize a surface light source having a uniform light distribution without unevenness of luminance.

In this embodiment, a diffusion plate 76 is disposed on the top surfaces of the light guide plates 13a, 13b, and 73c via an adhesive layer 72 made from an adhesive. That is to say, unlike the fifth embodiment shown in FIG. 15 in which the diffusion portion is integrally formed on the top surfaces of the light guide plates 13a, 13b, and 73c, the diffusion plate 76 is separately prepared and is bonded to the top surfaces of the light guide plates 13a, 13b, and 73c.

The adhesive for forming the adhesive layer 72 may be the same as the transparent adhesive described in the previous embodiments. The diffusion plate 76 is preferably configured to have a light diffusivity larger than that of the light guide plate 13a or the like and may be made from, typically, DR-3C (trade name, sold by Nitto Resin Co., Ltd.). The thickness of the diffusion plate 76 may be set to about 0.5 mm, and the light transmittance thereof may be set to about 70%.

In this surface light source system 75, the end planes 77b and 77c, on which light rays from the light sources are made incident, of the second light guide plate 13b and the third light guide plate 73c are slightly tilted. For example, the lower side of each of the incident end planes 77b and 77c is tilted by about 15° the direction away from the light source.

With this configuration, although any light introducing portion is not provided, a dark portion is not formed on the surface light source at each of a connection portion between the light source 11b and the light guide plate 13b and a connection portion between the light source 11c and the light guide plate 13c.

This embodiment can exhibit the same functions and effects as those in the first embodiment, and also exhibit the above-described function of preventing the formation of the dark portions.

(Seventh Embodiment)

Figure 17:
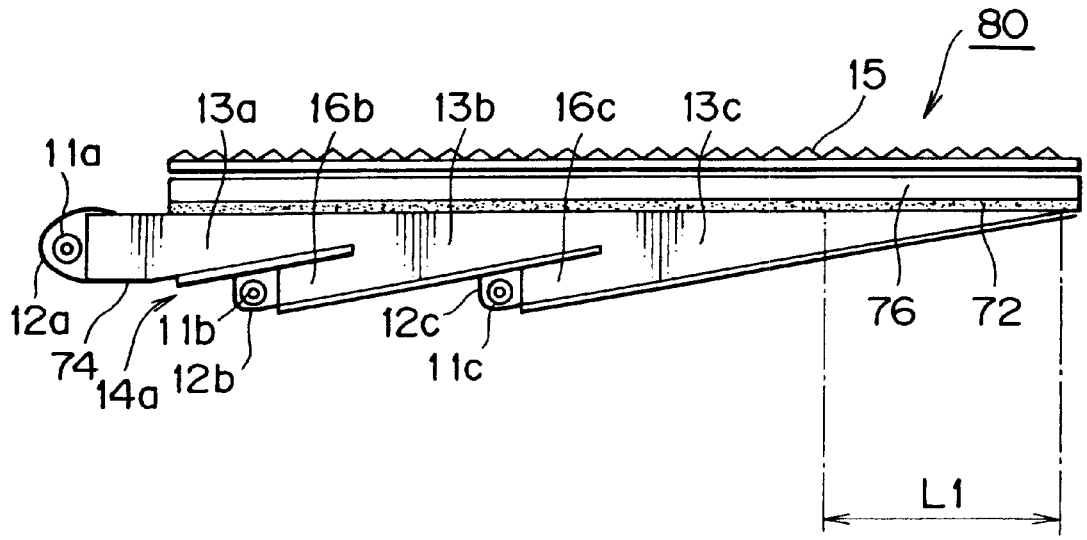
FIG. 17 is a schematic sectional view showing a seventh embodiment of the surface light source system according to the present invention.

FIG. 17 shows a seventh embodiment of the surface light source system according to the present invention.

In a surface light source system 80 shown in FIG. 17, parts corresponding to those described in the sixth embodiment are designated by the same characters and the overlapped description thereof is omitted.

The surface light source system 80 is different from the surface light source system 75 according to the sixth embodiment described with reference to FIG. 16 in that a first light guide plate 13a and a second light guide plate 13b are provided with light introducing portions 16b and 16c, respectively, and a thick diffusion plate 76 is formed.

The light introducing portions 16b and 16c are the same as those described in the surface light source system 10 according to the first embodiment.

As compared with the surface light source system 75 according to the sixth embodiment, the surface light source system 80 is advantageous in that the unevenness of luminance becomes smaller because of the formation of the light introducing portions 16b and 16c and the improved diffusivity due to the increased thickness of the diffusion plate 76. The other functions and effects of the surface light source system 80 are the same as those of the surface light source system 75 according to the sixth embodiment.

(Eighth Embodiment)

Figure 18:
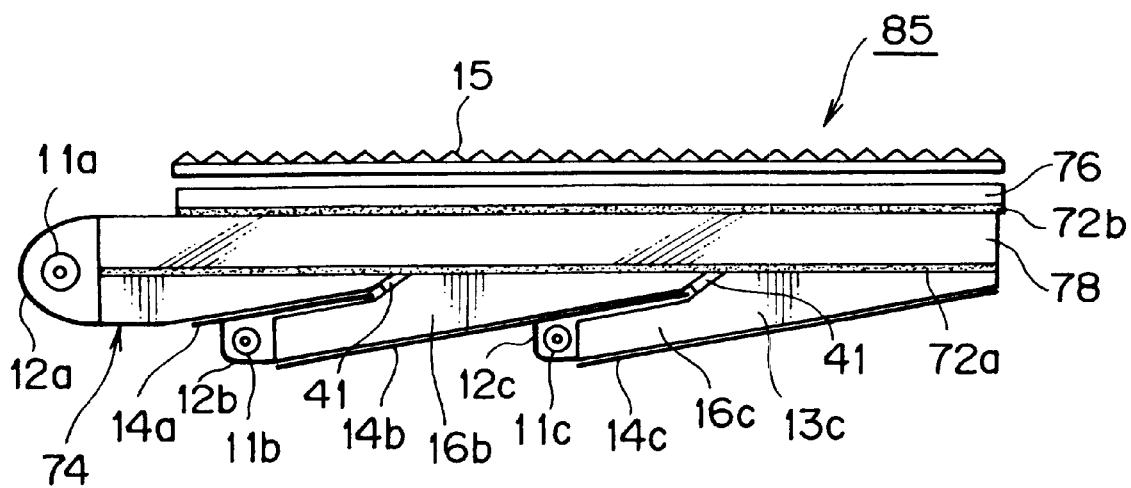
FIG. 18 is a schematic sectional view showing an eighth embodiment of the surface light source system according to the present invention.
Figure 19:
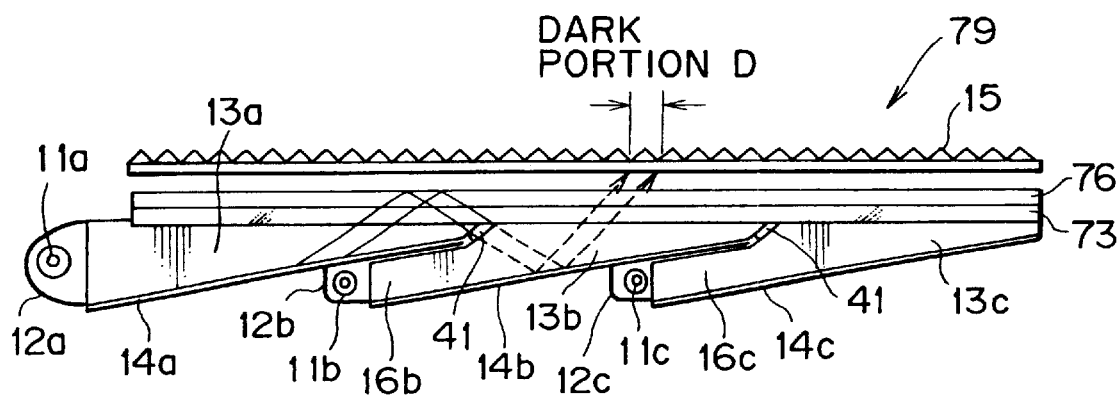
FIG. 19 is a schematic sectional view showing a variation or comparative example of the fifth embodiment of the surface light source system according to the present invention.

FIG. 18 shows an eighth embodiment of the surface light source system according to the present invention.

In a surface light source system 85 shown in FIG. 18, parts corresponding to those described in the sixth and seventh embodiments are designated by the same characters and the overlapped description thereof is omitted.

The surface light source system 85 is different from the surface light source system 80 according to the seventh embodiment in that light guide plates 13a, 13b, and 13c are separately formed, and a shielding layer 41 made from a light absorber (blackened material) as a shielding member is provided at each of the boundaries between the light guide plates 13a, 13b, and 13c, that is, at the thinnest rear end portion of each of the light guide plates 13a and 13b.

The shielding layer 41 is the same as that described with reference to FIG. 11. Further, in this embodiment, a transparent base plate 78 is provided on the top surfaces of the light guide plates 13a, 13b, and 13c via an adhesive layer 72a, and a diffusion plate 76 is provided on the transparent base plate 78 via an adhesive layer 72b.

The thickness of the transparent base plate 78 is larger than that of the thinnest rear end portion of each of the light guide plates 13a and 13b. For example, the thickness of the thinnest rear end portion of each of the light guide plates 13a and 13b is set to about 0.2 mm, while the thickness of the transparent base plate 78 is set to about 2 mm.

The shielding layers 41 are provided for preventing occurrence of luminous lines directly over the boundaries between the light guide plates 13a, 13b, and 13c separately formed. The provision of each of the shielding layers 41, however, may cause a dark portion D at a position apart rearwardly from the shielding layer 41, as shown by a surface light source system 79 as a variation or a comparative example in FIG. 19.

According to this embodiment, to cope with such an inconvenience, the thick transparent base plate 78 is provided between the light guide plates 13a, 13b, and 13c and the diffusion plate 76.

With this configuration, since the light guide plates 13a, 13b, and 13c are sufficiently apart from the diffusion plate 76 on which light rays from the light guide plates 13a, 13b, and 13c are made incident, to thereby eliminate uneven portions of light quantity equivalent to luminous lines or dark portions.

Even in this embodiment, there can be obtained the same functions and effects as those of the sixth embodiment.

(Ninth Embodiment)

Figure 20:
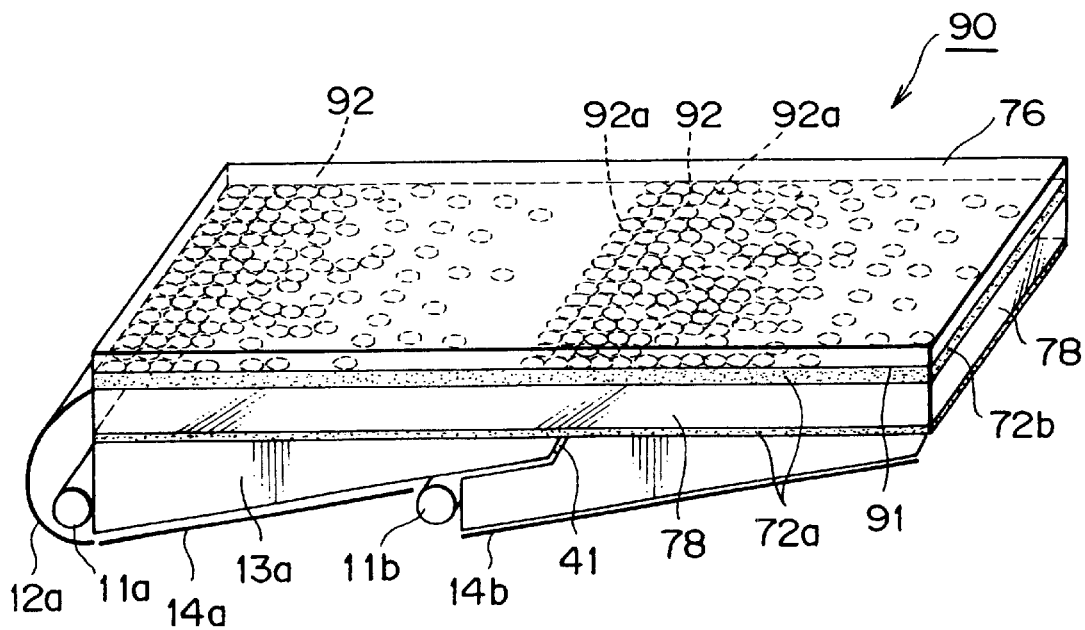
FIG. 20 is a schematic sectional view showing a ninth embodiment of the surface light source system according to the present invention.

FIG. 20 shows a ninth embodiment of the surface light source system according to the present invention.

In a surface light source system 90 shown in FIG. 20, parts corresponding to those described in the eighth embodiment are designated by the same characters and the overlapped description thereof is omitted.

In FIG. 20, for an easy understanding, only two light guide plates 13a and 13b are provided; however, three light guide plates may be provided. The flattened portion 74 described in the previous embodiments may be provided or not provided. Further, although the lens sheet 15 described in the previous embodiments is also provided in this embodiment, it is not shown for clarify a configuration of a light modulation portion to be described later.

The surface light source system 90 is different from the surface light source system 85 according to the eighth embodiment described with reference to FIG. 18 in that light modulation portions 91 are provided between a diffusion plate 76 and a transparent base plate 78.

According to this embodiment, light modulation films as the light modulation portions 91 are formed on the back surface of the diffusion plate 76 in such a manner as to correspond to the light guide plates 13a and 13b. In other words, the number of the light modulation films 91 corresponds to the number of light sources. A reflection pattern (density modulation pattern) 92 composed of a large number of dots is formed on each of the light modulation films 91.

In the example shown in FIG. 20, the light modulation film 91 is provided by forming a large number of dots 92a having the same shape as shown in the figure on the back surface of the diffusion plate 76 with white ink or the like.

The reflection pattern 92 composed of a large number of the dots 92a is configured such that the number of the dots 92a is made larger at a portion near the light source, at which a luminous line is easier to be formed on the surface light source, and the number of the dots 92a is made smaller at a portion farther apart therefrom, and that the dots 92a are not formed or less formed at a portion at which a dark portion is easier to be formed on the surface light source. That is to say, the reflection pattern is formed in such a manner as to be matched to bright and dark portions on the surface light source.

With this configuration, a reflection area becomes larger at a portion liable to become very bright on the surface light source and a reflection area becomes smaller at a portion liable to become very dark, with a result that the brightness can be equalized over the surface light source.

This embodiment can exhibit the same functions and effects as those of the eighth embodiment, and also can exhibit the above-described function of equalizing the brightness over the surface light source.

Figure 21:
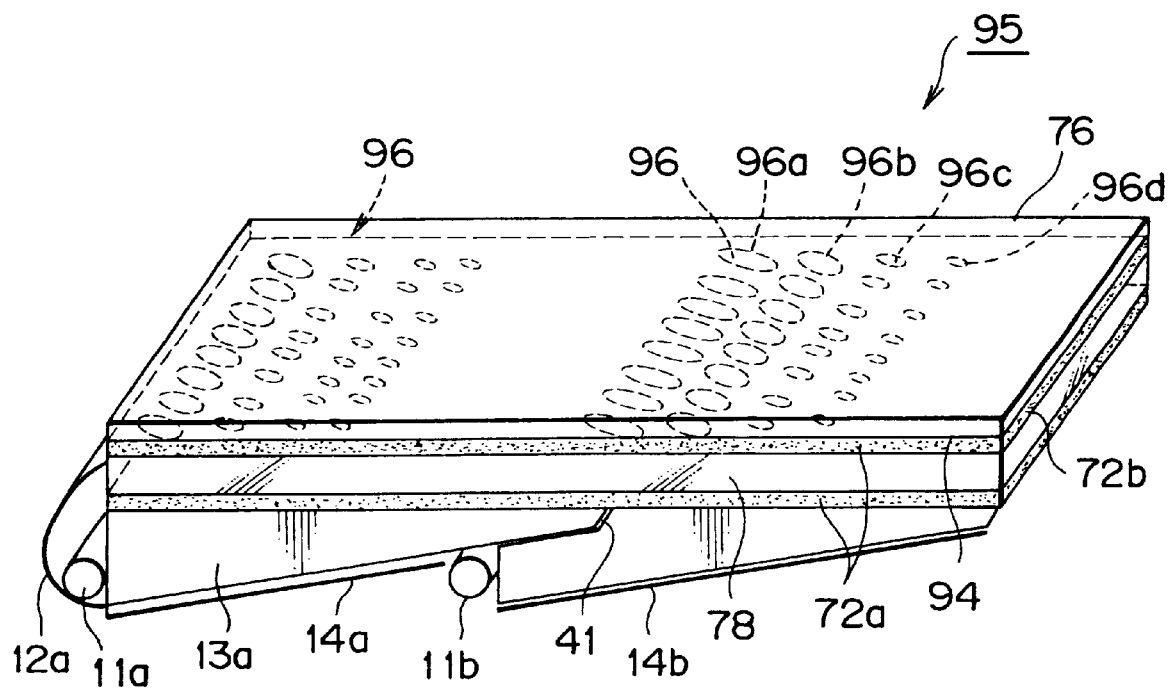
FIG. 21 is a schematic sectional view showing a variation of the ninth embodiment of the surface light source system according to the present invention.

FIG. 21 shows a variation of the ninth embodiment shown in FIG. 20.

In a surface light source system 95 shown in FIG. 20, parts corresponding to those described in the ninth embodiment are designated by the same characters and the overlapped description thereof is omitted. Further, in the surface light source system 95, parts not shown for convenience of description are the same as those in the ninth embodiment.

In this variation shown in FIG. 21, a light modulation portion 94 having a configuration different from that of the light modulation portion 91 shown in FIG. 20 is provided at the same position as that at which the light modulation portion 91 is disposed.

A reflection pattern 96 constituting the light modulation portion 94 is configured such that the area of each of dots is made larger (as designated by reference numeral 96a) at a portion near the light source, at which a luminous line is easier to be formed on the surface light source, and the area of each of the dots is made gradually smaller (as designated by reference numerals 96b, 96c, and 96d) at a portion farther apart therefrom, and that small dots are formed at a portion at which a dark portion is easier to be formed on the surface light source and large dots are formed at a portion at which a very bright portion is easier to be formed on the surface light source. That is to say, the reflection pattern is formed in such a manner as to be matched to bright and dark portions on the surface light source.

With this configuration, like the ninth embodiment shown in FIG. 20, a reflection area becomes larger at a portion liable to become very bright on the surface light source and a reflection area becomes smaller at a portion liable to become very dark, with a result that the brightness can be equalized over the surface light source.

Additionally, in the ninth embodiment shown in FIG. 20 and the variation shown in FIG. 21, the light modulation portion is formed by forming a printing pattern on the back surface of the diffusion plate 76 with white ink; however, it may be formed by forming a printing pattern on the back surface of the diffusion plate 76 with a material having a light diffusivity different from that of the diffusion plate 76.

In the above-described embodiment, a transparent adhesive such as silicone gel is used as a liquid transparent material, typically, for optically connecting the light guide plates 13b and 13c, or 62 and 63 to the light introducing portions 16b and 16c; however, the present invention is not limited thereto but is applicable to a configuration in which the boundaries, typically, between the light guide plates 13b and 13c, or 62 and 63 and the light introducing portions 16b and 16c is filled with a liquid transparent material such as a transparent sticker, followed by hardening thereof.

In the above-described embodiments, the three light guide plates 13a, 13b, and 13c, or 61, 62, and 63 are disposed in series; however, the present invention is not limited thereto but may be applied to a surface light source system in which two or four light guide plates are disposed in series.

In the above-described embodiments, the second and later light guide plates are provided with the light introducing portions 16b and 16c; however, the first light guide plate may be provided with the light introducing portion.

The configurations of the above-described embodiments and variations may be partially omitted and be freely combined with each other.

While the preferred embodiments have been described by using the specific terms, such description is for illustrative purposes only, and it is to be understood that changes and variations may be made without departing from the spirit or scope of the following claims.

What is claimed is:

1. A surface light source system having a front surface out of which light emanates and a back surface, the surface light source system comprising:

a plurality of bar-like light sources disposed in parallel to each other;

reflecting members, each reflecting member surrounding a right or left side, an upper side, and a lower side of a corresponding one of the light sources;

light guide plates made from a first transparent material, each light guide plate disposed along and extending from the left or right side of a corresponding one of the light sources and extending from the left or right side in a traveling direction of light, at least one of the light guide plates being shaped to taper in cross-section along the traveling direction of light, each of the light guide plates having a front surface and a back surface;

reflecting sheets, each of which is disposed on the back surface of a corresponding one of the light guide plates; and for each of at least a second and later ones of the light guide plates, a light introducing portion made from the first transparent material, the light introducing portion extending between the corresponding light source and the light guide plate to introduce light from the light source into the light guide plate, the light introducing portion having a front surface and a back surface, the front surface of the light introducing portion extending alongside a portion of the back surface of an adjacent light guide plate, wherein the light introducing portion is configured to cause light traveling therethrough to bend.

2. The surface light source system of claim 1, wherein at least one of the light introducing portions has a light source facing surface that is tilted forward in the traveling direction of light through the light introducing portion as viewed in a cross-section perpendicular to the light source system front surface, the tilt of the light source facing surface bending light introduced into the light introducing portion.

3. The surface light source system of claim 1, wherein the front and back surfaces of at least one of the light introducing portions are not smooth, the front and back surfaces causing light in the light introducing portion to reflect irregularly therefrom.

4. The surface light source system of claim 1, wherein the front and back surfaces of at least one light introducing portion are not parallel to each other so that light reflects from the front and back surfaces of the light introducing portion and upon exiting the light introducing portion is made incident on the front surface of the corresponding light guide plate.

5. The surface light source system of any of claims 1–3, wherein at least one light introducing portion is separate from its corresponding light guide plate.

6. The surface light source system of any of claims 1–3, wherein at least one light introducing portion is unitary with its corresponding light guide plate.

7. The surface light source system of any of claims 1–3, wherein a space surrounding at least one of the light sources is filled with a second transparent material.

8. The surface light source system of claim 7, wherein the second transparent material is a liquid.

9. The surface light source system of claim 7, wherein the second transparent material is hardened silicon gel.

10. The surface light source system of claim 7, wherein each light source has a space surrounding it, and the space is filled with the second transparent material, and wherein the second transparent material substantially is non-gaseous.

11. A surface light source system having a front surface out of which light emanates and a back surface, the surface light source system comprising:
   a plurality of bar-like light sources disposed in parallel to each other;
   reflecting members, each reflecting member surrounding a right or left side, an upper side, and a lower side of a corresponding one of the light sources;
   light guide plates made from a first transparent material, each light guide plate disposed along and extending from the left or right side of a corresponding one of the light sources and extending from the left or right side in a traveling direction of light, at least one of the light guide plates being shaped to taper in cross-section along the traveling direction of light, each of the light guide plates having a front surface and a back surface;
   reflecting sheets, each of which is disposed on the back surface of a corresponding one of the light guide plates; and
   for each of at least a second and later ones of the light guide plates, a light introducing portion made from the first transparent material, the light introducing portion extending between the corresponding light source and the light guide plate to introduce light from the light source into the light guide plate, the light introducing portion having a front surface and a back surface, the front surface of the light introducing portion extending alongside a portion of the back surface of an adjacent light guide plate,
   wherein,
      a space surrounding at least one of the light sources is filled with a second transparent material, and wherein the second transparent material substantially is non-gaseous.

12. The surface light source system of claim 11, wherein the second transparent material is a liquid.

13. The surface light source system of claim 11, wherein the second transparent material is hardened silicon gel.

14. The surface light source system of claim 11, wherein each light source has a space surrounding it, and the space is filled with the second transparent material.

15. A surface light source system having a front surface out of which light emanates and a back surface, the surface light source system comprising:
   a plurality of bar-like light sources disposed in parallel to each other;
   reflecting members, each reflecting member surrounding a right or left side, an upper side, and a lower side of a corresponding one of the light sources;
   light guide plates made from a transparent material, each light guide plate disposed along and extending from the left or right side of a corresponding one of the light sources and extending from the left or right side in a traveling direction of light, the light guide plates being shaped to taper in cross-section along the traveling direction of light, each of the light guide plates having a front surface and a back surface;
   reflecting sheets, each of which is disposed on the back surface of a corresponding one of the light guide plates; and
   for each of at least a second and later ones of the light guide plates, a light introducing portion made from the transparent material, the light introducing portion extending between the corresponding light source and the light guide plate to introduce light from the light source into the light guide plate, the light introducing portion having a front surface and a back surface, the front surface of the light introducing portion extending alongside a portion of the back surface of an adjacent light guide plate,
   wherein,
      the light guide plates are positioned to overlap one another and taper in cross-section, as taken perpendicular to the light source system front surface, so as to narrow substantially to a common location.

16. A surface light source system having a front surface out of which light emanates and a back surface, the surface light source system comprising:
   a plurality of bar-like light sources disposed in parallel to each other;
   reflecting members, each reflecting member surrounding a right or left side, an upper side, and a lower side of a corresponding one of the light sources;
   light guide plates made from a transparent material, each light guide plate disposed along and extending from the left or right side of a corresponding one of the light sources and extending from the left or right side in a traveling direction of light, at least one of the light guide plates being shaped to taper in cross-section along the traveling direction of light, each of the light guide plates having a front surface and a back surface;
   reflecting sheets, each of which is disposed on the back surface of a corresponding one of the light guide plates;
   for each of at least a second and later ones of the light guide plates, a light introducing portion made from the transparent material, the light introducing portion extending between the corresponding light source and the light guide plate to introduce light from the light source into the light guide plate, the light introducing portion having a front surface and a back surface, the front surface of the light introducing portion extending alongside a portion of the back surface of an adjacent light guide plate; and light diffusers positioned over the front surfaces of the light guide plates to diffuse light emanating therefrom.

17. The surface light source system of claim 15, wherein the light diffusers comprise coatings of light diffusive ink on the front surfaces of the light guide plates.

18. The surface light source system of claim 15, wherein a final light guide plate in the traveling direction of light is longer than any other light guide plate.

19. A surface light source system having a front surface out of which light emanates and a back surface, the surface light source system comprising:

a plurality of bar-like light sources disposed in parallel to each other;

reflecting members, each reflecting member surrounding a right or left side, an upper side, and a lower side of a corresponding one of the light sources;

light guide plates made from a transparent material, each light guide plate disposed along and extending from the left or right side of a corresponding one of the light sources and extending from the left or right side in a traveling direction of light, at least one of the light guide plates being shaped to taper in cross-section along the traveling direction of light, each of the light guide plates having a front surface and a back surface, each light guide plate having a leading end face facing away from its corresponding light source relative to the traveling direction of light therethrough;

reflecting sheets, each of which is disposed on the back surface of a corresponding one of the light guide plates; and for each of at least a second and later ones of the light guide plates, a light introducing portion made from the transparent material, the light introducing portion extending between the corresponding light source and the light guide plate to introduce light from the light source into the light guide plate, the light introducing portion having a front surface and a back surface, the front surface of the light introducing portion extending alongside a portion of the back surface of an adjacent light guide plate, wherein, the leading end faces of the light guide plates have surfaces that are tilted backward relative to the traveling direction of light therethrough, as viewed in a cross-section perpendicular to the light source system front surface.

20. The surface light source system of claim 19, wherein a first light introducing portion associated with a first light guide plate in the traveling direction of light includes a back surface having a flat portion parallel to the front surface of the first light guide plate.

21. The surface light source system of any of claims 19–20, further comprising a diffuser positioned over the front surfaces of the light guide plates.

22. The surface light source system of claim 21, wherein the diffuser is positioned to be spaced apart from the front surfaces of the light guide plates.

23. A surface light source system having a front surface out of which light emanates and a back surface, the surface light source system comprising:

a plurality of bar-like light sources disposed in parallel to each other;

reflecting members, each reflecting member surrounding a right or left side, an upper side, and a lower side of a corresponding one of the light sources;

light guide plates made from a transparent material, each light guide plate disposed along and extending from the left or right side of a corresponding one of the light sources and extending from the left or right side in a traveling direction of light, at least one of the light guide plates being shaped to taper in cross-section along the traveling direction of light, each of the light guide plates having a front surface and a back surface, each light guide plate having a trailing side relative to the traveling direction of light therethrough;

reflecting sheets, each of which is disposed on the back surface of a corresponding one of the light guide plates;

for each of at least a second and later ones of the light guide plates, a light introducing portion made from the transparent material, the light introducing portion extending between the corresponding light source and the light guide plate to introduce light from the light source into the light guide plate, the light introducing portion having a front surface and a back surface, the front surface of the light introducing portion extending alongside a portion of the back surface of an adjacent light guide plate; and a transparent base plate positioned between the light guide plates and a diffusion plate.

24. The surface light source system of claim 23, further comprising:

a shielding layer positioned at a boundary plane between a leading end plane of each of the light guide plates and the next one of the light guide plates, wherein the transparent base plate has a thickness that prevents formation of a dark portion above the diffusion plate at a position rearward from a shielding layer.

25. The surface light source system of claim 24, wherein the thickness of the transparent base plate is greater than a thickness of a rear end portion of a light guide plate.

26. The surface light source system of claim 24, wherein the thickness of the transparent base plate is about five times greater than the thickness of a rear end portion of a light guide plate.

27. The surface light source system of claim 24, wherein the thickness of the transparent base plate is about ten times greater than the thickness of a rear end portion of a light guide plate.

28. The surface light source system of claim 24, wherein the trailing side of the first light guide plate is positioned below a center of its associated bar-like light source and wherein a trailing side of the transparent base plate is positioned above the center of the bar-like light source associated with the first light guide plate.

29. A surface light source system having a front surface out of which light emanates and a back surface, the surface light source system comprising:

a plurality of bar-like light sources disposed in parallel to each other;

reflecting members, each reflecting member surrounding a right or left side, an upper side, and a lower side of a corresponding one of the light sources;

light guide plates made from a transparent material, each light guide plate disposed along and extending from the left or right side of a corresponding one of the light sources and extending from the left or right side in a traveling direction of light, at least one of the light guide plates being shaped to taper in cross-section along the traveling direction of light, each of the light guide plates having a front surface and a back surface, each light guide plate having a trailing side relative to the traveling direction of light therethrough;

reflecting sheets, each of which is disposed on the back surface of a corresponding one of the light guide plates;

for each of at least a second and later ones of the light guide plates, a light introducing portion made from the transparent material, the light introducing portion extending between the corresponding light source and the light guide plate to introduce light from the light source into the light guide plate, the light introducing portion having a front surface and a back surface, the front surface of the light introducing portion extending alongside a portion of the back surface of an adjacent light guide plate;

a diffusion plate;

a transparent base plate positioned between the light guide plates and the diffusion plate; and light modulation portions positioned between the diffusion plate and the transparent base plate.

30. The surface light source system of claim 29, wherein each of the light modulation portions is a light modulation film and wherein a modulation pattern composed of reflecting dots is formed on each light modulation film.

31. The surface light source system of claim 30, wherein a numeric density of reflecting dots of at least one modulation pattern decreased as a function of a distance that the reflecting dots resides from a bar-like light source.

32. The surface light source system of claim 30, wherein a size of the reflecting dots of at least one modulation pattern decreased as a function of a distance that the reflecting dots resides from a bar-like light source.

33. The surface light source system of claim 30, wherein each light modulation film is positioned on a back surface of the diffusion plate.

34. A surface light source system, comprising:

a plurality of bar-like light sources disposed in parallel to each other;

reflecting members, each of which is disposed to surround a right or left side, an upper side, and a lower side of the corresponding one of the light sources;

light guide plates made from a transparent material, each of which is disposed along the left or right side of the corresponding one of the light sources, and is formed into a taper shape in cross-section along the traveling direction of light; and reflecting sheets, each of which is disposed on the back surface of the corresponding one of the light guide plates, wherein each of at least the second and later ones of the light guide plates is, at its end portion on the light source side, integrated with a light introducing portion made from the transparent material, the light introducing portion extending from the end portion, on the light source side, of the light guide plate to a position under an end portion of a front side light guide plate adjacent to the light guide plate, and wherein a space, which is formed between an end plane, on the light source side, of each of the light introducing portions and the corresponding one of the reflecting members in such a manner as to surround the corresponding one of the light sources, is filled with a liquid transparent material.

35. A surface light source system according to claim 34, wherein each of at least the second and later ones of the reflecting sheets extends along the back surface of the corresponding one of the light introducing portions.

36. A surface light source system according to claim 34, wherein an end plane, on the light source side, of each of the light introducing portions is formed with its upper end tilted in the direction of the light guide plate.

37. A surface light source system according to claim 34, wherein a top surface or bottom surface of each of the light introducing portions is subjected to a coarsening treatment.

38. A surface light source system according to claim 34, wherein each of the light introducing portions is formed into a taper shape in vertical cross-section.

39. A surface light source system according to claim 34, wherein a diffusion portion having a light diffusivity different from that of the light guide plates is disposed on the top surfaces of the light guide plates.

40. A surface light source system according to claim 39, wherein a light modulation portion having a dot pattern for reflecting light on the light guide plate side is disposed between the light guide plates and the diffusion portion, the dot pattern being formed in such a manner that a dot pattern density is changed in the direction apart from each of the light sources.

41. A surface light source system according to claim 40, wherein the light modulation portion is formed by printing a light modulation material on the back surface of the diffusion portion.

42. A surface light source system according to claim 40, wherein the light guide plates are integrated with each other, and each of the light introducing portions is formed separately from the corresponding one of the light guide plates and is optically connected to an end plane, on the light source side, of the light guide plate.

43. A surface light source system according to claim 42, wherein a diffusion portion having a light diffusivity different from that of the light guide plates is disposed on the top surfaces of the light guide plates.

44. A surface light source system according to claim 43, wherein a light modulation portion having a dot pattern for reflecting light on the light guide plate side is disposed between the light guide plates and the diffusion portion, the dot pattern being formed in such a manner that a dot pattern density is changed in the direction apart from each of the light sources.

45. A surface light source system according to claim 44, wherein the light modulation portion is formed by printing a light modulation material on the back surface of the diffusion portion.

46. A surface light source system according to claim 34, wherein each of the light guide plates is formed separately from the corresponding one of the light sources; each of the light introducing portions is formed integrally with the corresponding one of the light guide plates; and the light guide plates are optically connected to each other.

47. A surface light source system according to claim 46, wherein a diffusion plate having a light diffusivity different from that of the light guide plates is disposed on the top surfaces of the light guide plates, and the light guide plates are fixedly held by the diffusion plate to be thereby integrated with each other.

48. A surface light source system according to claim 46, wherein a diffusion plate having a light diffusivity different from that of the light guide plates is disposed on the top surfaces of the light guide plates, and the light guide plates are fixedly held by a transparent plate disposed between the diffusion plate and the light guide plates to be thereby integrated with each other.

49. A surface light source system, comprising:

a plurality of bar-like light sources disposed in parallel to each other;

reflecting members, each of which is disposed to surround a right or left side, an upper side, and a lower side of the corresponding one of the light sources;

light guide plates made from a transparent material, each of which is disposed along the left or right side of the corresponding one of the light sources, and is formed into a taper shape in cross-section along the traveling direction of light; and reflecting sheets, each of which is disposed on the back surface of the corresponding one of the light guide plates, wherein each of at least the second and later ones of the light guide plates is, at its end portion on the light source side, integrated with a light introducing portion made from a transparent material, the light introducing portion extending from the end portion, on the light source side, of the light guide plate to a position under an end portion of a front side light guide plate adjacent to the light guide plate, wherein each of the light guide plates is formed separately from the corresponding one of the light sources; each of the light introducing portions is formed integrally with the corresponding one of the light guide plates; and the light guide plates are optically connected to each other, wherein a shielding member is disposed at a boundary plane between a leading end plane of each of the light guide plates and the next one of the light guide plates, wherein the shielding member is tilted at a tilt angle being nearly equal to a critical angle determined by a refractive index of a transparent material for forming the light guide plates and the light introducing portions, and wherein each of the light introducing portions has on its top surface a stepped portion for receiving a leading end of the front side light guide plate, and the stepped portion is tilted at a tilt angle nearly equal to a critical angle determined by a refractive index of a transparent material for forming the light introducing portions.

50. A surface light source system, comprising:

a plurality of bar-like light sources disposed in parallel to each other;

reflecting members, each of which is disposed to surround a right or left side, an upper side, and a lower side of the corresponding one of the light sources;

light guide plates made from a transparent material, each of which is disposed along the left or right side of the corresponding one of the light sources, and is formed into a taper shape in cross-section along the traveling direction of light; and reflecting sheets, each of which is disposed on the back surface of the corresponding one of the light guide plates, wherein each of at least the second and later ones of the light guide plates is, at its end portion on the light source side, integrated with a light introducing portion made from a transparent material, the light introducing portion extending from the end portion, on the light source side, of the light guide plate to a position under an end portion of a front side light guide plate adjacent to the light guide plate, wherein each of the light guide plates is formed separately from the corresponding one of the light sources; each of the light introducing portions is formed integrally with the corresponding one of the light guide plates; and the light guide plates are optically connected to each other, and wherein a diffusion plate having a light diffusivity different from that of the light guide plates is disposed on the top surfaces of the light guide plates, and the light guide plates are fixedly held by a transparent plate disposed between the diffusion plate and the light guide plates to be thereby integrated with each other.

51. A surface light source system according to claim 50, wherein a light modulation portion having a dot pattern for reflecting light on the light guide plate side is disposed between the light guide plates and the diffusion portion, the dot pattern being formed in such a manner that a dot pattern density is changed in the direction apart from each of the light sources.

52. A surface light source system according to claim 50, wherein the light modulation portion is formed by printing a light modulation material on the back surface of the diffusion portion.

53. A surface light source system according to claim 50, wherein a shielding member is disposed at a boundary plane between a leading end plane of each of the light guide plates and the next one of the light guide plates.

54. A surface light source system according to claim 53, wherein the shielding member is tilted at a tilt angle being nearly equal to a critical angle determined by a refractive index of a transparent material for forming the light guide plates and the light introducing portions.

55. A surface light source system according to claim 50, wherein the light guide plates are formed in such a manner that leading ends thereof in the traveling direction of light extend to the same position.

* * * * *